United States Patent [19]
Imamura

[11] Patent Number: 6,167,410
[45] Date of Patent: Dec. 26, 2000

[54] DOCUMENT PROCESSING APPARATUS FOR ADDING PREDETERMINED DESIGN TYPES TO AN ORIGINAL DOCUMENT

[75] Inventor: Keiichi Imamura, Tokyo, Japan

[73] Assignee: Casio Computer Co., Ltd., Tokyo, Japan

[21] Appl. No.: 09/014,318

[22] Filed: Jan. 27, 1998

[30] Foreign Application Priority Data

| Jan. 30, 1997 | [JP] | Japan | 9-029864 |
| Aug. 25, 1997 | [JP] | Japan | 9-241722 |
| Oct. 29, 1997 | [JP] | Japan | 9-311574 |

[51] Int. Cl.[7] .................................................. G06F 17/21
[52] U.S. Cl. ........................................ 707/530; 707/517
[58] Field of Search ................................... 707/514, 530, 707/517, 531

[56] References Cited

U.S. PATENT DOCUMENTS

| 5,302,969 | 4/1994 | Kuroda et al. | 345/168 |
| 5,608,857 | 3/1997 | Ikeo et al. | 707/500 |
| 5,615,320 | 3/1997 | Lavendel | 345/431 |
| 5,903,905 | 5/1999 | Anderson et al. | 707/526 |

*Primary Examiner*—Stephen S. Hong
*Attorney, Agent, or Firm*—Frishuaf, Holtz, Goodman, Langer & Chick, P.C.

[57] ABSTRACT

In a document processing apparatus equipped with a computer program storage medium, a preselected decoration is made on document data. A CPU analyzes document structures of the overall document in unit of a document structural element, and extracts a predetermined structural element from these analyzed structural elements as a design element to be designed. Then, the CPU retrieves a table contained in a RAM based on an attribute of this design element. This table fixedly stores specific decoration information with respect to each of the attributes of the design elements. The CPU retrieves the decoration information corresponding to the attribute of the extracted design element, and then decorated the design element based on this decoration information. As a result, a predetermined decoration can be made on the document data.

3 Claims, 26 Drawing Sheets

| | |
|---|---|
| DOCUMENT MEMORY | 2-1 |
| DOCUMENT STRUCTURE ANALYSIS TABLE | 2-2 |
| DOCUMENT ANALYZED RESULT MEMORY | 2-3 |
| AUTOMATIC DESIGN MASTER TABLE | 2-4 |
| ELEMENT DESIGN COMMAND TABLE | 2-5 |
| DECORATION CODE TABLE | 2-6 |
| DOCUMENT DESIGN BUFFER | 2-7 |
| DECORATION RESULT MEMORY | 2-8 |
| FIGURE COMPONENT MEMORY | 2-9 |
| PROCESS POINTER N/PROCESS POINTER M | 2-10 |
| n - REGISTER | 2-11 |
| WORK MEMORY | 2-12 |
| RAM | |

FIG.2

DOCUMENT STRUCTURE ANALYSIS TABLE

| DESIGN ELEMENT | ELEMENT ANALYSIS CONDITION |
|---|---|
| TITLE | CONTENT OF TITLE CONDITION |
| MAIN TITLE | CONTENT OF MAIN TITLE CONDITION |
| MEDIUM TITLE | CONTENT OF MEDIUM TITLE CONDITION |
| SUB TITLE | CONTENT OF SUB TITLE CONDITION |
| TABLE | CONTENT OF TABLE CONDITION |
| FIGURE | CONTENT OF FIGURE CONDITION |
| CHARACTER/SYMBOL | CONTENT OF CHARACTER/SYMBOL CONDITION |
| ⋮ | ⋮ |

FIG.3

DOCUMENT ANALYZED RESULT MEMORY

| DESIGN ELEMENT ID (ATTRIBUTE) | POSITIONAL INFORMATION | PERIPHERAL EMPTY INFORMATION |
|---|---|---|
| | | |

FIG.4

AUTOMATIC DESIGN MASTER TABLE

| USAGE/ TOUCH ID | DESIGN ELEMENT ID | SUBJECT-1 DESIGN NUMBER | SUBJECT-2 DESIGN NUMBER | |
|---|---|---|---|---|
| 1 | 1 | 2 | 3 | |
| 1 | 2 | 2 | 5 | |
| 1 | 3 | 6 | 8 | |
| 1 | 4 | 13 | 2 | |
| 1 | 5 | 4 | 6 | |
| 1 | 6 | 8 | 4 | |
| 1 | 7 | 2 | 5 | |
| 1 | 8 | 1 | 11 | |
| 1 | 9 | 16 | 12 | |
| 1 | 10 | 4 | 7 | |
| 1 | 11 | 2 | 9 | |
| 1 | 12 | 5 | 2 | |
| ... | ... | ... | ... | |
| 1 | 123 | 1 | 2 | |
| 1 | 124 | 3 | 5 | |

(LINE TO BE PROCESSED)

FIG.5A

ELEMENT DESIGN COMMAND TABLE

| DESIGN ELEMENT ID | DESIGN NUMBER | COMMAND EXECUTION SEQUENCE | COMMAND ID | <op1> | <op2> |
|---|---|---|---|---|---|
| 1 | 2 | 1 | 33 | 42 | |
| 1 | 2 | 2 | 8 | | |
| 1 | 2 | 3 | 2 | | |
| 1 | 2 | 4 | 6 | | |
| 1 | 2 | 5 | 4 | | |
| 1 | 2 | 6 | 19 | 2 | |
| 1 | 2 | 7 | 11 | | |
| 1 | 2 | 8 | 12 | | |
| 1 | 2 | 9 | 7 | | |

(LINE TO BE PROCESSED)

FIG.5B

DECORATION CODE TABLE

| DECORATION ID | ATTRIBUTE ITEM 1 | ATTRIBUTE ITEM 2 | ATTRIBUTE ITEM 3 | |
|---|---|---|---|---|
| 1 | 1 | 6 | 3 | |
| 2 | 1 | 1 | 7 | |
| 3 | 4 | 1 | 5 | |
| 4 | 3 | 4 | 3 | |

FIG.5C

Designer xxxxxxxxxxxxxxxxxxxxxxxxxxxxxxxxxxx
xxxxxxxxxxxxxxxxxxxxxxxxxxxxxxxxxxx
xxxxxxxxxxxxxxxxxxxxxxxxxxxxxxxxxxx
xxxxxxxxxxxxxxx §1.xx
oooooo xxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxx

| xxxxx | | % | |
|---|---|---|---|
| | MALE | FEMALE | TOTAL |
| WORDPROCESSOR | 130 | 35 | 180 |
| TABLE PROCESS | 44 | 7 | 57 |
| ADDRESS | 87 | 19 | 107 |
| SCHEDULE | 12 | 3 | 18 |
| POST-CARD FORMING | 72 | 23 | 99 |
| CHARACTER RECOGNITION | 75 | 16 | 97 |

| xxxxx | | % | |
|---|---|---|---|
| | MALE | FEMALE | TOTAL |
| FORMING OF BUSINESS DOCUMENT | 67 | 14 | 89 |
| POST CARDS, eg., NEW YEAR GREETING CARD | 28 | 9 | 39 |
| REPORT/GRADUATION THESIS | 10 | 6 | 17 |
| FORMING OF GUIDE DOCUMENT | 15 | 2 | 18 |
| LABEL PRINTING | 1 | 1 | 2 |
| WRITING | 12 | 5 | 19 |

TABLE1 : xxxxx

TABLE1 : XXXXX

| XXXXX | MALE | FEMALE | % | TOTAL |
|---|---|---|---|---|
| WORDPROCESSOR | 130 | 35 |  | 180 |
| TABLE PROCESS | 44 | 7 |  | 57 |
| ADDRESS | 87 | 19 |  | 107 |
| SCHEDULE | 12 | 3 |  | 18 |
| POST-CARD FORMING | 72 | 23 |  | 99 |
| CHARACTER RECOGNITION | 75 | 16 |  | 97 |

| XXXXX | MALE | FEMALE | % | TOTAL |
|---|---|---|---|---|
| FORMING OF BUSINESS DOCUMENT | 67 | 14 |  | 39 |
| POST-CARDS, eg, NEW YEAR GREETING CARD | 28 | 9 |  | 39 |
| REPORT/GRADUATION THESIS | 10 | 6 |  | 17 |
| FORMING OF GUIDE DOCUMENT | 15 | 2 |  | 18 |
| LABEL PRINTING | 1 | 1 |  | 2 |
| WRITING | 12 | 5 |  | 19 |

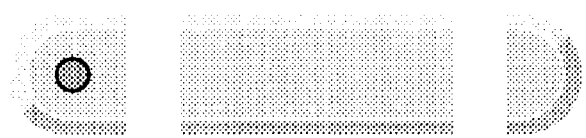
FIG.13A
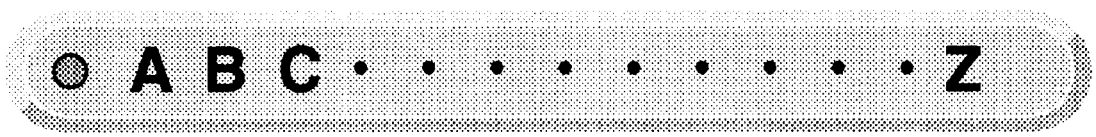
FIG.13B

| | |
|---|---|
| DOCUMENT MEMORY | 12-1 |
| DOCUMENT STRUCTURE ANALYSIS TABLE | 12-2 |
| DOCUMENT ANALYZED RESULT MEMORY | 12-3 |
| AUTOMATIC DESIGN MASTER TABLE | 12-4 |
| ELEMENT DESIGN COMMAND TABLE | 12-5 |
| DECORATION CODE TABLE | 12-6 |
| DOCUMENT DESIGN BUFFER | 12-7 |
| DECORATION RESULT MEMORY | 12-8 |
| FIGURE COMPONENT MEMORY | 12-9 |
| PROCESS POINTER N/PROCESS POINTER M | 12-10 |
| n - REGISTER | 12-11 |
| WORK MEMORY | 12-12 |
| EMPTY INFORMATION TABLE | 12-13 |
| RAM | |

FIG.17

EMPTY INFORMATION TABLE

| DESIGN ELEMENT ID | DESIGN NUMBER | COLUMN NUMBER | LINE NUMBER | CALCULATION PARAMETER 1 | CALCULATION PARAMETER 2 |
|---|---|---|---|---|---|
| 1 | 1 | 20 | 6 | 20 | 5 |
| 1 | 2 | 20 | 3 | 20 | 0 |
| 1 | 3 | 22 | 4 | 20 | 3 |
| 1 | 4 | 24 | 3 | 20 | 14 |
| 1 | 5 | 32 | 2 | 20 | 0 |
| 1 | 6 | 46 | 2 | 0 | 0 |
| 1 | 7 | 20 | 3 | 0 | 0 |
| 1 | 8 | 21 | 7 | 20 | 12 |
| 1 | 9 | 20 | 4 | 20 | 8 |
| 1 | 10 | 20 | 5 | 20 | 0 |

FIG.18D

AUTOMATIC DESIGN MASTER TABLE

| USAGE/TOUCH ID | DESIGN ELEMENT ID | SUBJECT-1 DESIGN MUNBER | SUBJECT-2 DESIGN MUNBER |
|---|---|---|---|
| 1 | 1 | 2 | 3 |
| 1 | 2 | 2 | 5 |
| 1 | 3 | 6 | 8 |
| 1 | 4 | 13 | 2 |
| 1 | 5 | 4 | 6 |
| 1 | 6 | 8 | 4 |
| 1 | 7 | 2 | 5 |
| 1 | 8 | 1 | 11 |
| 1 | 9 | 16 | 12 |
| 1 | 10 | 4 | 7 |
| 1 | 11 | 2 | 9 |
| 1 | 12 | 5 | 2 |
| 1 | 123 | 1 | 2 |
| 1 | 124 | 3 | 5 |

(LINE TO BE DESIGN-PROCESSED)

FIG.18A

COMMAND TABLE

| DESIGN ELEMENT ID | DESIGN NUMBER | COMMAND EXECUTION SEQUENCE | COMMAND ID | <op1> |
|---|---|---|---|---|
| 1 | 2 | 1 | 33 | 42 |
| 1 | 2 | 2 | 8 | |
| 1 | 2 | 3 | 2 | |
| 1 | 2 | 4 | 6 | |
| 1 | 2 | 5 | 4 | |
| 1 | 2 | 6 | 19 | 33,2 |
| 1 | 2 | 7 | 11 | |
| 1 | 2 | 8 | 12 | |
| 1 | 2 | 9 | 7 | |

(LINE TO BE DESIGN-PROCESSED)

FIG.18B

DECORATION CODE TABLE

| DECORATION ID | ATTRIBUTE ITEM 1 | ATTRIBUTE ITEM 2 | ATTRIBUTE ITEM 3 |
|---|---|---|---|
| 1 | 1 | 6 | 3 |
| 2 | 1 | 1 | 7 |
| 3 | 4 | 1 | 5 |
| 4 | 3 | 4 | 3 |

FIG.18C

DOCUMENT PROCESSING APPARATUS FOR ADDING PREDETERMINED DESIGN TYPES TO AN ORIGINAL DOCUMENT

BACKGROUND OF THE INVENTION

1. Field of the Invention

The present invention is related to a document processing apparatus capable of decorating document data in a simple manner, and also to a program storage medium used in such a document processing apparatus.

2. Description of the Prior Art

Conventionally, document processing apparatuses such as personal computers and wordprocessors are capable of producing color graphic documents by using a large number of tables, graphs, illustrations, images, and the like. In these conventional document processing apparatuses, operators execute input operations for designating various elements one by one, e.g., "title", "index", "figure", "caption", "page background", and "arrow", while considering layouts of entire documents, so that various types of decorations such as colors, meshing, reversing, and underlines may be made with respect to each of the elements.

However, in order that the entire documents are made up with a high sense and further with graphically better conditions, various types of graphical techniques/senses and also deep knowledge of softwares are required for these layout operations. In addition, very heavy workloads are given to these operators. For instance, the operators should complete desirable layout s of overall documents after trial and error, while observing display screens.

SUMMARY OF THE INVENTION

The present invention has been made to solve the above-described drawbacks of the conventional document processing apparatus, and therefore, has an object to provide a document processing apparatus capable of executing document decorations in a good design sense without requiring a great amount of work by an operator, and high sense/deep knowledge by the operator.

Also, the present invention has another object to provide a document processing apparatus capable of achieving graphically better decorations of documents without changing layout conditions of the entire documents, while considering easy-reading-characteristics of the entire documents in unit of a document.

It is a further object of the present invention to provide a program storage medium capable of storing therein a software program suitably realizing the above-described automatic document layouts in a better design sense and also graphically better decorations of documents.

A document processing apparatus, according to an aspect of the present invention, is featured by such a document processing apparatus wherein document data constituted by combining a plurality of partial document data is stored, comprising:

decoration information storage means for storing therein decoration information related to plural sorts of document structural elements for constituting a document with respect to each of plural document design sorts;

design sort selecting means for arbitrarily selecting a desirable document design sort with regard to document data to be designed;

disassembling means for analyzing said document data to be designed to disassemble the designing document data, thereby producing a plurality of partial document data;

judging means for judging a document structural element sort of each of the disassembled partial document data;

decoration information selecting means for selecting sorts of the decoration information corresponding to the respective partial document data based upon both the document design sort selected by the design sort selecting means and the document structural element sort of the partial document data judged by said judging means; and decoration process means for executing a decoration process operation for the respective partial document data in accordance with the selected decoration information selected based on the respective partial document data.

A computer program storage medium; according to another aspect of the present invention, is featured by such a storage medium for storing a computer program used to realize:

a function for storing therein decoration information related to plural sorts of document structural elements for constituting a document with respect to each of plural document design sorts;

a function for arbitrarily selecting a desirable document design sort with regard to document data to be designed;

a function for analyzing the document data to be designed to disassemble the designing document data, thereby producing a plurality of partial document data;

a function for judging a document structural element sort of each of the disassembled partial document data;

a function for selecting sorts of the decoration information corresponding to the respective partial document data based upon both the selected document design sort and the judged document structural element sort of the partial document data; and a function for executing a decoration process operation for the respective partial document data in accordance with the selected decoration information selected based on the respective partial document data.

As a consequence, any operators can automatically decorate documents with maintaining better design feelings without requiring a cumbersome manual decoration process, and without changing overall document layouts, while considering easy-reading-characteristics in unit of a single document.

Also, a document processing apparatus, according to another aspect of the present invention, is featured by such a document processing apparatus wherein document data constituted by combing a plurality of partial document data is stored, comprising:

decoration information storage means for storing therein decoration information with respect to a sort of a specific document structural element sort for constituting a document;

component information storage means for storing therein a plurality of image component information used to form a predetermined background image with regard to the decoration information;

disassembling means for analyzing document data to be designed to disassemble the designing document data, thereby producing a plurality of partial document data;

extracting means for extracting partial document data having the specific document structural element sort from the disassembled partial document data; and background image forming means for forming a background image related to the specific document structural element sort of partial document data extracted by the extracting means in such a manner that the plurality of component information stored in the component information storage means is combined with each other in order to fit a size of the background image to a size of the partial document data.

Furthermore, a computer program storage medium, according to a further aspect of the present invention, is featured by such a storage medium for storing a computer program used to realize:

a function for storing therein decoration information with respect to a sort of a specific document structural element for constituting document;

a function for storing therein a plurality of image component information used to form a predetermined background image with regard to the decoration information;

a function for analyzing document data to be designed to disassemble the designing document data, thereby producing a plurality of partial document data;

a function for extracting partial document data having the specific document structural element sort from the disassembled partial document data; and a function for forming a background image related to the extracted specific document structural element sort of partial document data in such a manner that the plurality of stored component information is combined with each other in order to fit a size of the background image to a size of the partial document data.

Accordingly, when the element to be designed is decorated by employing such an image responding to a sort of this designing element, any types of designing elements can be decorated without deteriorating the original image feelings, even if these designing elements own any shapes.

BRIEF DESCRIPTION OF THE DRAWINGS

A more complete understanding of the teachings of the present invention may be acquired by referring to the accompanying figures, in which like reference numbers indicate like features and wherein:

FIG. 2 schematically indicates a major memory structure of a RAM 2 employed in the document processing apparatus of FIG. 1;

FIG. 3 shows contents of document structure analysis tables 2—2 and 12-2 used in the first and second embodiment modes;

FIG. 4 indicates contents of document analyzed result tables 2-3 and 12-3 used in the first and second embodiment modes;

FIG. 5A partially shows a content of an automatic design master table 2-4 used in the first embodiment, FIG. 5B partially indicates a content of an element design command table 2-5, and FIG. 5C partially represents a content of a decoration code table 2-6;

FIG. 8 shows an example of original documents processed by the document processing apparatus according to the first and second embodiment modes;

FIG. 9 indicates one example when the original document shown in FIG. 8 is designed;

FIGS. 13A and 13B indicate another design condition when the plural components are combined with each other to design according to the first embodiment mode;

FIG. 17 schematically shows a major memory structure of a RAM 2 employed in the document processing apparatus according to the second embodiment mode;

FIG. 18A partially represents a content of an automatic design master table 12-4 used in the second embodiment mode, FIG. 18B partially shows a content of an element design command table 12-5, FIG. 18C partially denotes a content of a decoration code table 12-6, and FIG. 12D partially indicates a content of an empty information table 12-13;

DETAILED DESCRIPTION OF THE PREFERRED EMBODIMENTS

Referring now to FIG. 1 to FIG. 16, a document processing apparatus according to a first preferred embodiment mode of the present invention will be described.

OVERALL ARRANGEMENT OF FIRST DOCUMENT PROCESSING APPARATUS

Figure 1:
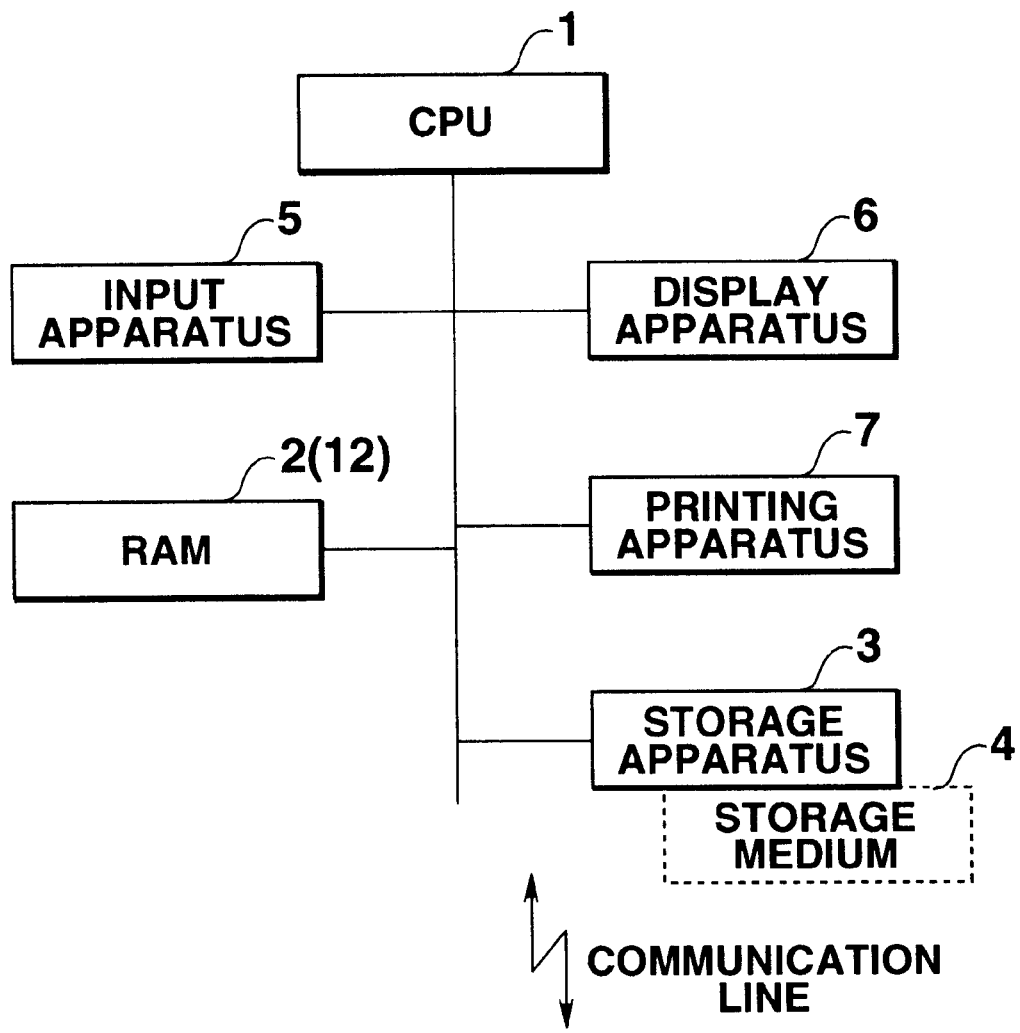
FIG. 1 is a schematic block diagram for representing an entire arrangement of a document processing apparatus according to first and second embodiment modes of the present invention.

FIG. 1 is a schematic block diagram for representing an entire arrangement of the document processing apparatus according to the first embodiment mode (hereinafter referred to as a "first document processing apparatus").

In FIG. 1, a CPU 1 corresponds to a central processing unit for controlling an overall operation of this first document processing apparatus in accordance with various programs loaded in a RAM (random access memory) 2. A storage apparatus 3 contains a storage medium 4 and a drive system of this storage medium 4. This storage medium 4 previously stores thereinto an operating system (OS), various sorts of application programs, data files, character font data, and the like. This storage medium 4 may be mounted in a fixing manner, or in a detachable manner. The storage medium 4 may be constructed of a magnetic/optical storage medium, and a semiconductor memory such as a floppy disk (FDD), a hard disk (HD), an optical disk, and a RAM card. The program and the data saved in the storage medium 4 are loaded on the RAM 2 under control of the CPU 1, if required. Furthermore, according to the first document processing apparatus, the CPU 1 may receive a program and data, which are transmitted via a communication line from other appliances (not shown in detail) to store these program/data into the storage medium 4, and further may use program/data stored in storage media employed in other appliances via the communication line.

Also, input/output peripheral devices such as an input apparatus 5, a display apparatus 6, and a printing apparatus 7 are connected via a bus line to this CPU 1, so that operations of these input/output peripheral devices are controllable by the CPU 1 in accordance with an input/output program. The input apparatus 5 contains a pointing device such as a keyboard and a mouse, by which character string data may be inputted, and various sorts of commands may be entered. The character string data entered by this input apparatus 5 is displayed on a text screen of the display apparatus 6, whereas character string data mixed with a KANJI character which has been converted by a KANA/KANJI (character) converting process operation is saved as a defined character string into a document memory 2-1 (see FIG. 2) within the RAM 2. The display apparatus 6 corresponds to a liquid crystal display (LCD), a CRT (cathode-ray tube) display device, and a plasma display device, which are capable of performing a multi-color representation. The printing apparatus 7 corresponds to a full color printer apparatus, e.g., a non-impact printer such as a thermal transfer printer and an ink jet printer, and also a dot impact printer.

MAJOR MEMORY REGIONS OF RAM

FIG. 2 schematically indicates major memory regions of the RAM 2 employed in the first document processing apparatus of FIG. 1. Various sorts of memory regions are allocated to this RAM 2. That is, a document memory 2-1 of this RAM 2 is a text memory capable of storing document data. In this first embodiment, a table (list), a graph, an illustration, a photographed image may be merged into a document.

A document structure analysis table 2—2 is used to be referred while the CPU 1 analyzes the content of the document memory 2-1. FIG. 3 indicates a detailed content of this document structure analysis table 2—2. In this first embodiment, the CPU 1 analyzes the content of the document memory 2-1 in unit of a document so as to extract a structural element having a predetermined attribute as a "design element" for a designing purpose among the respective structural elements for constituting an entire document. In this case, the CPU 1 extracts the design element with reference to the content of the document structure analysis table 2—2. This document structure analysis table 2—2 fixedly stores elements analysis conditions with respect to each of attributes (sorts) of the design elements. For instance, as an element analysis condition corresponding to a design element "title", the following definitions are made: A character string (stream) located at a head line of a document, and there is no punctuation. Also, as an element analysis condition corresponding to a design element "main title", the following definitions are made: A predetermined title symbol is present at a head column, and no punctuation is present. Furthermore, as to element analysis conditions corresponding to "medium title" and "subtitle", the following definitions are made. A column position of a head character of "medium title", or "subtitle" is paragraphed with respect to an upper-grade title character string. Also, as to an element analysis condition of a design element "table", the following definitions are made: A table frame and a cell frame are present. Also, as to an element analysis condition corresponding to a design element "character/symbol", the following definitions are made: This design element is a specific character, or a symbol. It should be noted that the analysis conditions corresponding to 124 sorts of design elements are defined in this document structure analysis table 2-1.

The document analyzed result memory 2-3 of the RAM 2 stores/saves analyzed results obtained by analyzing document structures. FIG. 4 represents a detailed content of this document analyzed result memory 2-3. In other words, the document analyzed result memory 2-3 is so arranged as to store an ID (identification), positional information, and empty space information about a peripheral space with respect to each of design elements extracted by analyzing documents. The design element ID corresponds to data used to identify attributes such as "title", and "main title". The positional information corresponds to two-point (i.e., upper left and lower right) coordinate string data indicative of a rectangular region in which a design element is present. Furthermore, the peripheral empty space information corresponds to data indicative of dimensions of empty spaces existing in upper/lower/right/left directions of a design element in unit of a data. The above-described information is detected by the CPU 1 to be set into the document analyzed result memory 2-3 when the document structure is analyzed.

The automatic design master table 2-4 of the RAM 2 stores therein decoration information (design number) specific to each of the attributes of the design elements in a fixed manner. FIG. 5A partially represents a content of this automatic design master table 2-4. In other words, the automatic design master table 2-4 is so arranged by that an usage/touch ID, a design ID, a subject-1 design number, a subject-2 design number, and the like are stored as record data for one line, and these data are stored for plural records. In this first embodiment mode, the usage/touch ID defines various usage, for example, "document for planning report", "document for OHP", and "document for poster/advertisement", and also defines various touches, for instance, "three-dimensional expression", "two-dimensional expression", "color", "monochrome", "colorful", and "simple". The ID numbers "1", "2", - - - , are described in the automatic design master table 2-4 while both the usage and the touch are combined with each other as one set. For instance, the usage/touch ID "1" represents that the usage is "document for planning report", and the touch is "color". It should also be noted that as to this touch, more than two sorts of touches are defined, for instance, a combination of "colorful" and "color", and another combination of "three-dimensional expression" and "color". When an arbitrary usage/touch ID is selected/designated by a user, the respective lines within the automatic design master table 2-4 corresponding thereto are designated as lines to be processed. That is, the operator may select/design an arbitrary sort of design among various sorts of designs which have been previously defined by the usage/touch.

Also, all of the design element IDs are defined from a top number thereof to a final number thereof into the automatic design master table 2-4 with respect to each of the usage/touch IDs. In this case, the design elements ID"1" to ID"124" correspond to 124 sorts of design elements defined in the document structure analysis table 2—2. A design number is used to designate a design for decorating the corresponding design element. As an example of these design elements, 124 sorts of design elements have been previously stored into the automatic design master table 2-4. That is, the sizes of these design elements are different from each other, for instance, are gradually decreased. A plurality of design numbers are defined as selected subjects with respect to the respective design elements. In this case, a design element is indicated as a subject-1 design number thereof. In such a case that if a certain design element is tried to be decorated by a proper design, then this design element cannot be properly decorated in view of a peripheral empty space of this design element, another subject-2 design number corresponding to the next subject is designated. In other words, the subject-2 design number is used to designate another design having a size smaller than that of such a design indicated by the subject-1 design number. Subsequent designs are designated which are smaller than the preceding designs in view of their sizes. As a consequence, the subject-1 design number is firstly accessed. If the accessed design is not proper in view of the size thereof, then the next subject-2 design number is secondly accessed. If this secondly accessed design is not proper in view of the size thereof, a further subsequent subject is accessed.

The element design command table 2-5 of the RAM 2 stores fixedly therein execution commands and the like used to decorate/process design elements. FIG. 5B partially indicates a content of the element design command table 2-5. That is, the element design command table 2-5 is so arranged that a design ID, a design number, a command execution sequence, a command ID, and 10 sorts of option numeral values OP1, OP2, - - - OP10 are handled as one record data for one line, and a plurality of record data are stored. In this first embodiment, in the automatic design master table 2-4, the element design command table 2-5 is addressed based on the design element ID and the subject design number, which are designated from a head line among the respective lines designated as the lines to be processed every 1 line, so that the corresponding content of the element design command table 2-5 is designated as the line to be processed. In this case, "command execution sequence" indicates which commands should be executed in the sequential order as to the line to be processed within the element design command table 2-5. In the example shown in FIG. 5B, such definition is made that the commands indicated by the command ID should be executed in this sequential order of "33, 8, 2, - - - , 7". Also, "option numeral values OP1 to OP10" define the decoration code, and the positional coordinates, which are used to access the figure number and the decoration code table 2-6. For instance, an option numeral value OP1 "42" of a command ID "33" defines that an illustration component denoted by a figure number "42" is called to be written as a background image of a design element. Also, an option numeral value OP1 "2" of a command ID "19" defines that the decoration code table 2-6 is accessed by a decoration code "2", and a design element should be decorated by an attribute defined in the decoration code table 2-6. Furthermore, a command ID"4" represents that a design element should be moved to such a position indicated by the option numeral value OP1 (X coordinate) and the option numeral value OP2 (Y coordinate) with respect to a reference coordinate (upper left coordinate) thereof.

The decoration code table 2-6 stores therein a plurality of attribute items every decoration ID. FIG. 5C partially shows a content of this decoration code table 2-6. In other words, plural sorts of attribute items corresponding to the decoration IDs 1, 2, - - - , are fixedly stored in the decoration code table 2-6. As the plural sorts of attribute items, there are listed, for instance, writing styles, character sorts, widths, painting, shadowing, and colors.

Also, in addition, a document design buffer 2-7, a decoration result memory 2-8, a figure component memory 2-9, a process pointer group 2-10, an n-register 2-11, and a work memory 2-12 are provided in the RAM 2. The figure component memory 2-9 is employed in order that an image specific to an attribute of a design element is subdivided into a plurality of components, and these plural components are stored therein. For example, in such a case that a ruled line frame for surrounding a character string is replaced by a three-dimensional image with a shadow to be decorated, as indicated in FIG. 11, this three-dimensional image is subdivided into 9 components, and these 9 subdivided components are stored/managed, namely components of four corners indicated by illustration IDs "284", "285", "286", "287"; upper/lower/right/left outside components represented by illustration IDs "288", "289", "290", "291"; and also a center component indicated by an illustration ID "292". Also, as indicated in FIG. 13, when such a three-dimensional image with a belt-shaped shadow, both edges of which are semi-circular, is decorated, this three-dimensional image is subdivided into three components, namely both edge components and a center component, which are stored/managed.

OPERATIONS OF FIRST DOCUMENT PROCESSING APPARATUS

Referring now to flow charts shown in FIG. 6 and FIG. 7, operations of the first document processing apparatus will be explained. It should be understood that the programs capable of realizing various functions as described in the below-mentioned flow charts are stored in the storage medium 4 in the program code formats readable by the CPU 1, and the contents of these programs are loaded on the work memory 2-12 employed in the RAM 2.

Figure 6:
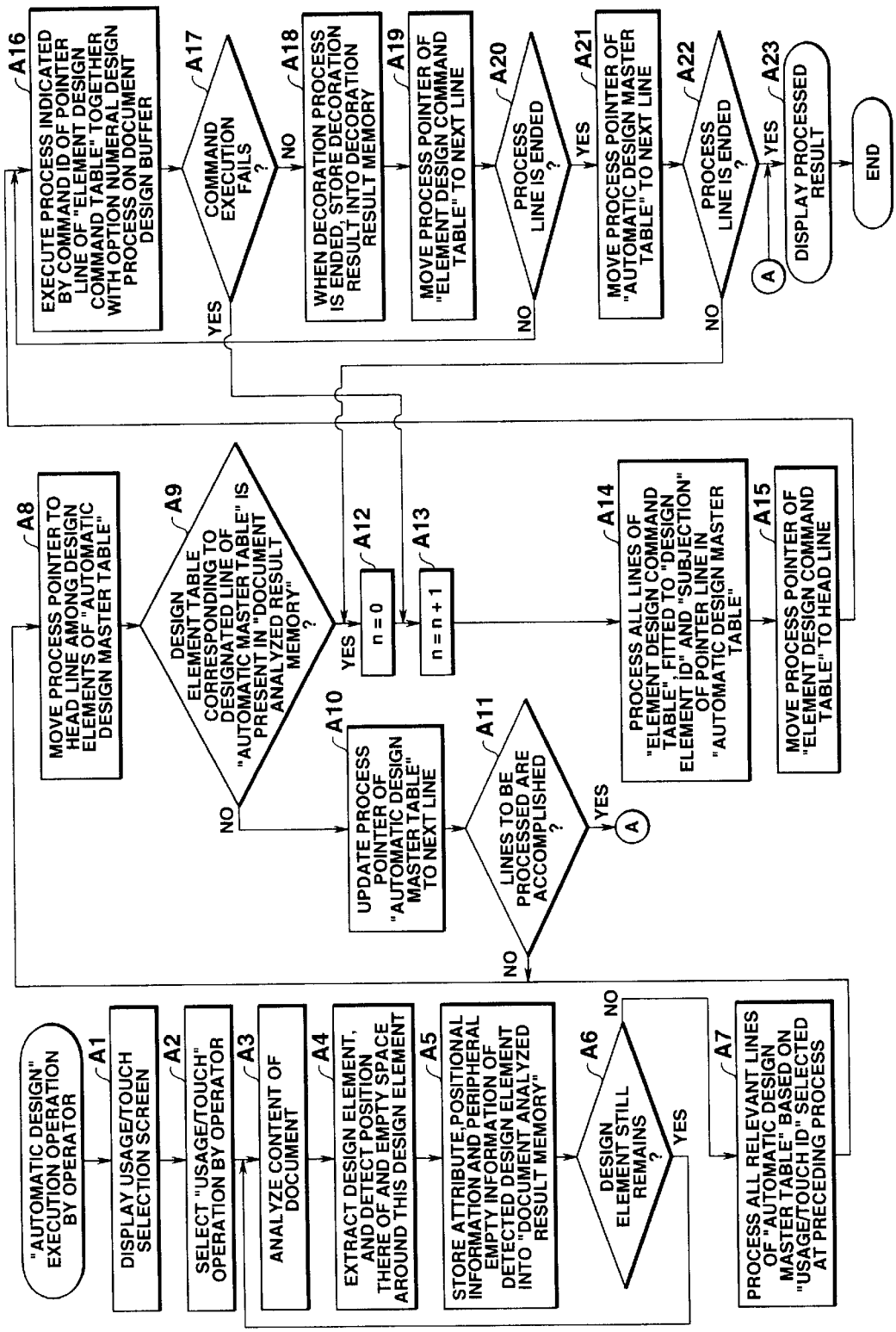
FIG. 6 is a flow chart for describing an automatic design process operation executed in the document processing apparatus according to the first embodiment mode.
Figure 7:
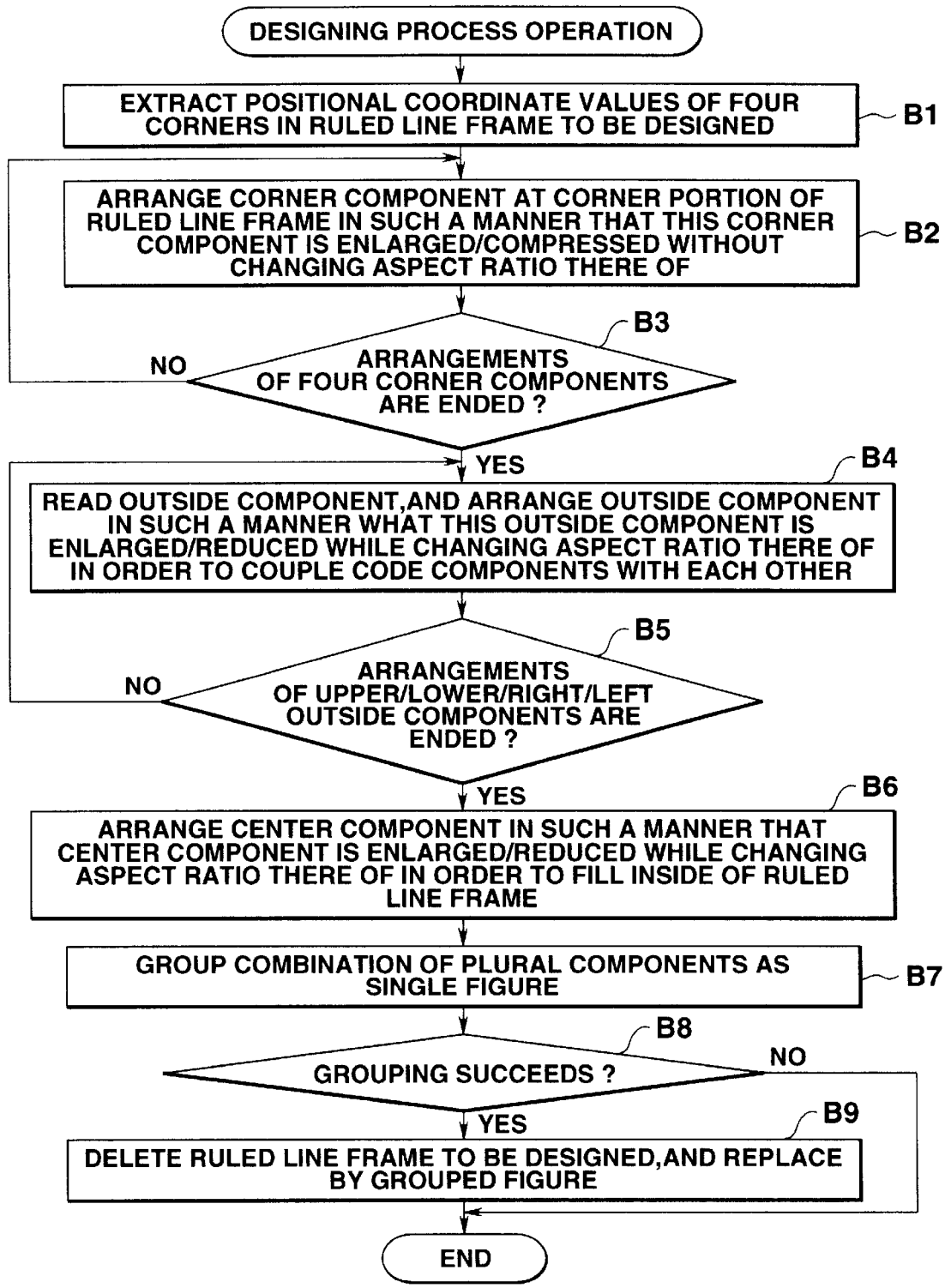
FIG. 7 is a flow chart for describing a designing example when a plurality of components are combined with each other to design according to the first embodiment mode.

Now when the document data stored in the document memory 2-1 is designated as a document to be designated, and also the automatic design command is entered from the input apparatus 5, the execution of the automatic design process operation is commenced in accordance with the flow chart shown in FIG. 6. First, since the menu items of the usage/touch are list up based on the content of the automatic design master table 2-4 (step A1), the operator selects/designates an arbitrary menu items from this display screen (step A2). It is now assumed that such a document as indicated in FIG. 8 is designated as the document to be designed, and furthermore the touches "document for planning report"/"color" are selected/designated.

As a result, the CPU 1 sequentially analyzes this document from the head (top) line thereof (step A3), extracts the design element with reference to the document structure analysis table 2—2, and detects the position of this extracted design element and also the empty space around this extracted design element (will be also referred to as a "peripheral empty space information" hereinafter) (step S4). Since a character string "Designer" of the head line indicated in FIG. 8 corresponds to the title defined in the document analysis table 2—2, the CPU 1 stores the attribute "title" thereof, the positional information, and the peripheral empty space information into the document analyzed result memory 2-3 (step A5). Then, a check is made as to whether or not there is such a design element having a condition corresponding to the design element defined in this document structure analysis table 2—2 (step A6). If the design element is present, then the automatic design process operation is returned to the previous step A3, so that the above-explained process operation is repeatedly performed. As a result, "main title", "medium title", "subtitle", - - - are extracted as the design elements, respectively, and then the analyzed results are stored into the document analyzed result memory 2-3 with respect to each of these design elements. In this case, a character string "XXXX - - - XX" appearing within the rectangular shape is recognized as "main title"; another character "S?1.XX" is recognized as "medium tile"; and another character string "000" is recognized as "subtitle". Also, such a character string containing a matrix-shaped ruled line is recognized as a table (list) which may constitute an element to be designed. Other document data are excluded from the elements to be designed.

When the entire document is analyzed in this manner and it is so detected at the step A6 that there is no design element, the CPU 1 retrieves the automatic design master table 2-4 based on the usage/touch ID select/designated at the step A2 to thereby designate all of the lines corresponding to the usage/touch ID to be processed (step A7). FIG. 5A represents such a case that "1" is designated as the usage/touch ID, namely "document for planning report"/"color" are designated. Next, the CPU 1 sets a value of the process pointer N for designating a read address of the automatic design master table 2-4 among the lines to be processed as a head line thereof (step A8). Then, another check is made as to whether or not the design element corresponding to the designated line of the automatic design master table 2-4 is set into the document analyzed result memory 2-3 (step A9). If the corresponding design element is not present, then the process pointer N of the automatic design master table 2-4 is updated to the subsequent line (step A10). As a result, another check is made as to whether or not all of the lines to be processed have been designated (step A11). If the line designation is not accomplished, then the process operation is returned to the step A9. The operation for retrieving the design element set in the document analyzed result memory 2-3 is repeatedly performed.

As a result, when the relevant design element is retrieved, the process operation is advanced to a step A12 so as to clear the value of the n-register 2-11. In this case, the n-register 2-11 addresses the subject design number described in the automatic design master table 2-4. After the content of the n-register 2-11 is cleared, "1" is added to the value of this n-register 2-11 at the next step A13, so that "1" is set as an initial value to the value of the n-register 2-11. Then, the CPU 11 retrieves the design element ID stored in the automatic design master table 2-4 designated by the process pointer N, and also a subject-n design number designated by the value of the n-register 2-11, and thereafter retrieves the element design command table 2-5 based on these read design element ID and subject-n design number so as to designate all of the lines fitted to these design element ID/subject-n design number as the lines to be processed (step A14). FIG. 5B represents such a case that the respective lines stored in the element design command table 2-5 and corresponding to the design element ID"1" and the design number "2" are designated as the lines to be processed. Then, a value of the process pointer M for designating the read address of the element design command table 2-5 among the lines to be processed is set as a head line thereof (step A15). Under this condition, a decoration process operation indicated by the "command ID" described in the designated line stored in the element design command table 2-5 is executed with reference with the option numeral values OP1 to OP10 (step A16). In this execution, the decoration process operation of the design element is performed on the document design buffer 2-7.

CONCRETE EXAMPLES OF DECORATION

A description will now be made of concrete examples of decoration process operations executed in the first document processing apparatus. In accordance with the first document processing apparatus, an illustration designated by an option numeral value is called from the figure component memory 2-9 of the RAM 2 so as to be arranged as a background image at a head character position and the like of a design element, more than 2 illustrations are called from this figure component memory 2-9 so as to be combined with each other, and then the combined image is arranged as a background image. Alternatively, a background image is shadowed, varnished, or colored. Furthermore, a dimension (size) of a background image is controlled, adjusted based upon peripheral empty space information set into the document structure analysis table 2-2, which corresponds to this design element. Also, a character string of a design element is superimposed on a background image, a character string of a design element is converted into a writing style and the like defined in the decoration code table 2-6, or this character string is colored. Alternatively, only characters which constitute a portion of a character string is enlarged/reduced, or inverted. Also, in the case that a plurality of components are combined with each other to thereby produce an image, while an aspect ratio of each of these components is changed, this component is enlarged/reduced based on peripheral empty space information, or is deformed. Alternatively, data for constituting a table is disassembled with respect to each of cells, and then the respective cells are specifically decorated, or only partial cell data is emphasized. It should be noted that these decoration process operations are executed in accordance with the command ID and the option numeral values OP1 to OP10, which are described in the element design command table 2-5, and the command execution sequential operations thereof. This first document processing apparatus can decorate the design elements in any ways in accordance with the contents described in the element design command table 2-5.

When the decoration process operation is carried out for the design element in accordance with the contents described in the design command table 2-5, the process operation is advanced to a step A 17 of the flow chart shown in FIG. 6, at which a judgement is made as to whether or not the command execution fails. In other words, such a judgement is made at this step A 17 as to whether or not a shortable of space occurs even when the dimension of the decorated design element is reduced/deformed to be adjusted based on empty space information around this design element. When a shortage of space occurs and the command execution fails, the process operation is advanced to a step A 13 at which the value of the n-register 2-1 is updated, and a designation is made of a design number of the next subject within the automatic design master table 2-4 is designated. Subsequently, a similar process operation is repeatedly performed.

As a consequence, when a detection is made of such a fact that the command execution succeeds ("NO" at step A 17), the content (namely, decorated design element) of the document design buffer 2-7 is stored into the decoration result memory 2-8 (step A 18). Then, the process pointer M of the element design command table 2-5 is updated to the next line (step A 19). The above-described process operations defined from the step A 16 to the step A 20 are repeatedly performed until all of the lines to be processed, saved in the element design command table 2-5 are ended (step A20).

As a result, when the completion of the process operation is detected at a step A20, the automatic design process operation is advanced to a further step A 21 at which the updating process operation is carried out for the process pointer N of the automatic design master table 2-4. Then, the above-explained process operations defined from the step A 9 to the step A 22 are repeatedly performed until all of the lines to be processed, saved in the automatic design master table 2-4 are ended (step A 22). As a consequence, when the decoration process operation is accomplished for all of the design elements contained within one document, this fact is detected at the step A 22. Thus, the process operation is advanced to a step A 23. At this step A 23, the content of the document memory 2-1 is displayed. In this case, the design element saved in the document memory 2-1 is replaced by the content saved in the decoration result memory 2-8 to be displayed.

Figure 10:
FIG. 10 shows another example when the original document shown in FIG. 8 is designed.

FIG. 9 shows a concrete example in the case that the document indicated in FIG. 8 is designed. As apparent from this designed document of FIG. 9, "title", "main title", "medium title", "subtitle", and "table" are full of variety, as compared with those of the original document. Since the relevant portions are visually emphasized, the operators can readily read the entire document, and also this designed document owns better appearances. FIG. 10 indicates a concrete example in such a case that the touch is changed in the same usage.

Figure 15A:
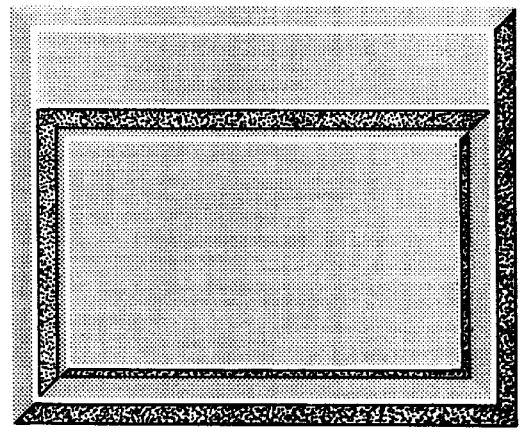
FIGS. 15A to 15C are explanatory diagram for explaining a basic technical idea of the present invention indicated in the first embodiment mode, which corresponds to FIGS. 11A to 11C.
Figure 15B:
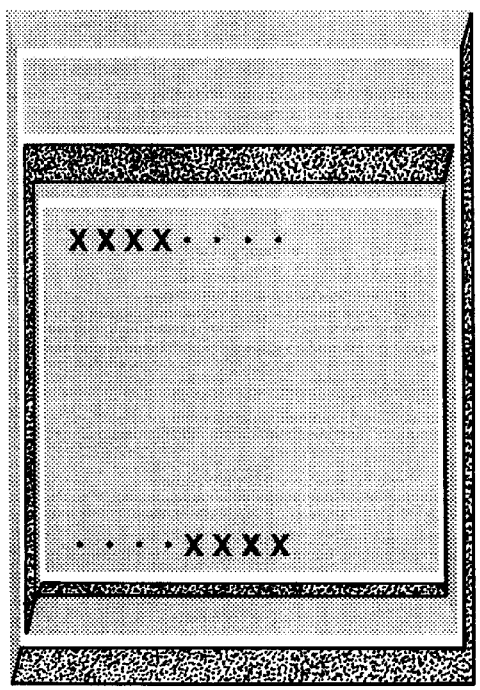
Figure 15C:
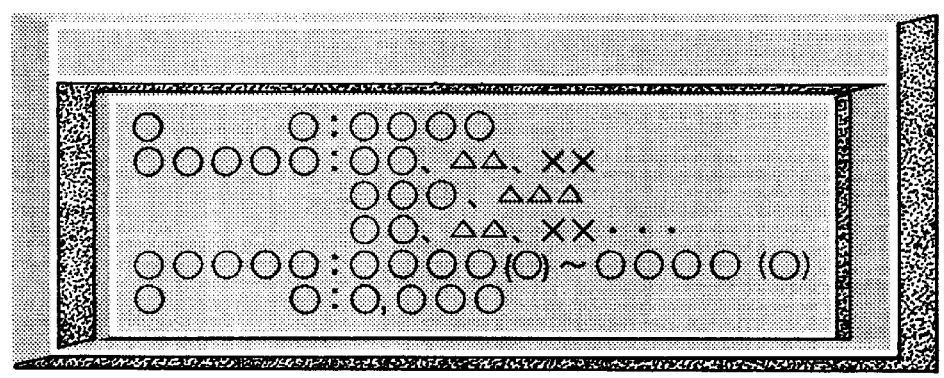

As described above, in accordance with the document processing apparatus of the first embodiment mode, when a character string is surrounded by a ruled line frame having a rectangular shape, this ruled line frame may be decorated in better design sense by replacing this ruled line frame by a three-dimensional image with a shadow. In other words, FIG. 15 indicates one decoration example as to this character string surrounded by the rectangular ruled line frame. For example, in such a case that a character string is decorated by using a three-dimensional image with a shadow as indicated in FIG. 15A, this character string is deformed along the longitudinal direction in accordance with the shape of the ruled line for surrounding the character string, as shown in FIG. 15B. Otherwise, this character string is deformed along the lateral direction in accordance with the shape of the ruled line, as represented in FIG. 15C. In this case, if the degree of this deformation is increased, then the original shape will collapse. For example, in the case of FIG. 15B, the widths of the upper/lower shadow portions are widened, whereas the widths of the right/left shadow portions are narrowed. Conversely, in the case of FIG. 15C, the widths of the upper/lower shadow portions are made narrower than those of the original portions, and the widths of the right/left shadow portions are made wider than those of the original portions. Even in such a decoration, the decorated ruled line frame may have better design appearances, as compared with the original ruled line frame.

Figure 16A:
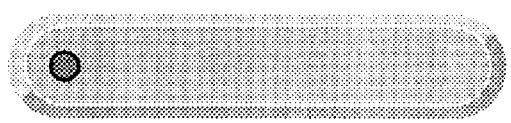
FIGS. 16A and 16B are explanatory diagram for explaining a basic technical idea of the present invention indicated in the first embodiment mode, which corresponds to FIGS. 13A to 13B.
Figure 16B:
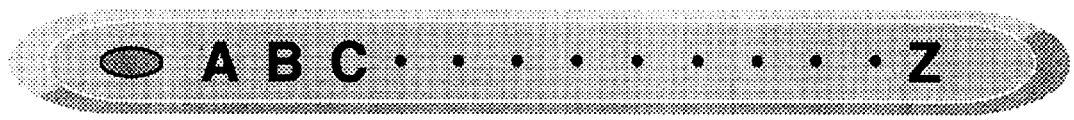

Similarly, as indicated in FIG. 16A, when the decoration process operation is carried out by employing a three-dimensional image with a shadow, both the edges of which are semi-circles, if this three-dimensional image is extended along the transverse direction, then the semi-circular edge portions are defined in ellipse shapes, and thus the original shapes will collapse. However, this deformed ruled line frame may have better design appearances. As a consequence, in accordance with the present invention, such a decoration manner never causes any problems.

However, in the document processing apparatus of the first embodiment mode, when the element to be design is decorated by employing the image responding to the sort of this element, even if this element to be designed owns any types of shapes, this element can be decorated without deteriorating the original image feelings.

Figure 11A:
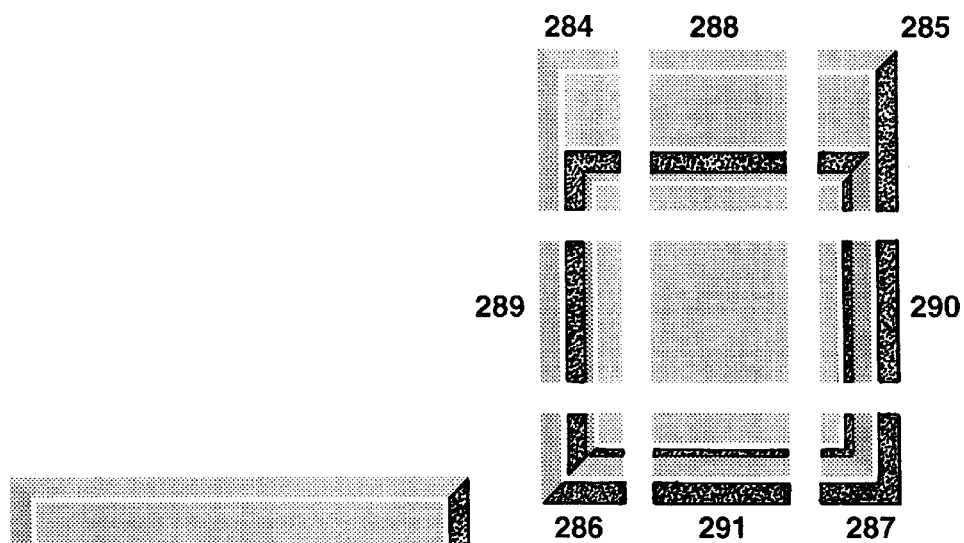
FIGS. 11A to 11C show such conditions that a plurality of components are combined with each other to design according to the first embodiment mode.
Figure 11B:
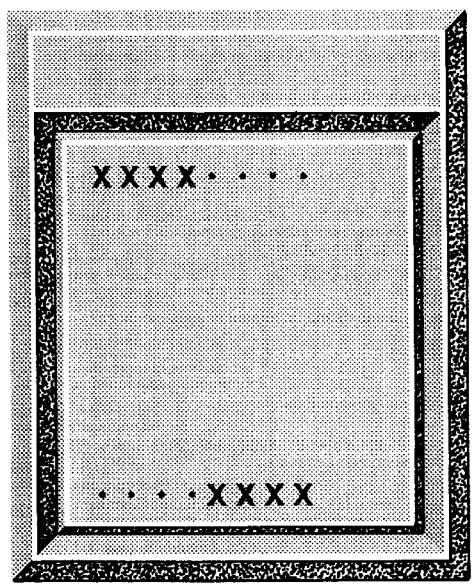
Figure 11C:
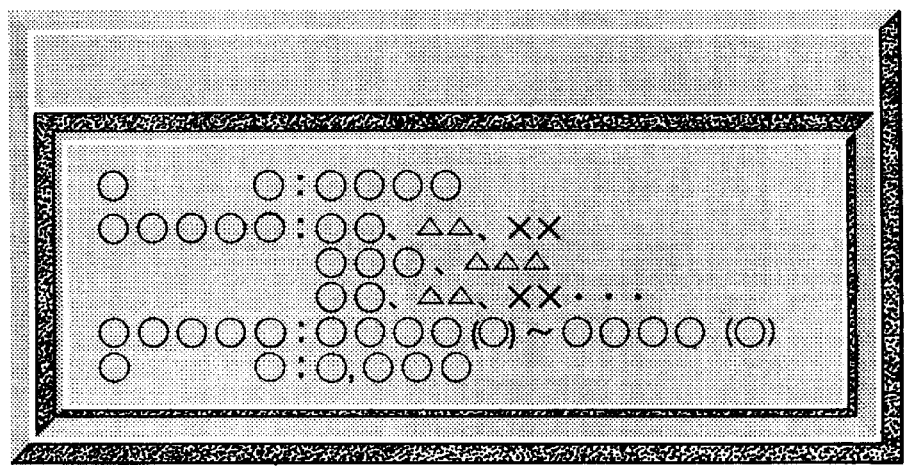

A description will now be made of such a decoration example without deteriorating original image feelings in such a manner that when a character string is surrounded by a ruled line frame, this ruled line frame is extracted as a design element, and then this ruled line frame is replaced by a three-dimensional image with a shadow, as indicated in FIGS. 11A to 11C.

Figure 12A:
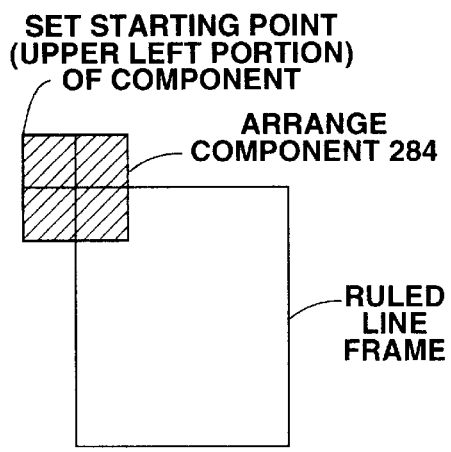
FIG. 12A to FIG. 12E schematically show design operation stages when the plural components shown in FIG. 7 and FIG. 11A to 11C are designed.
Figure 12B:
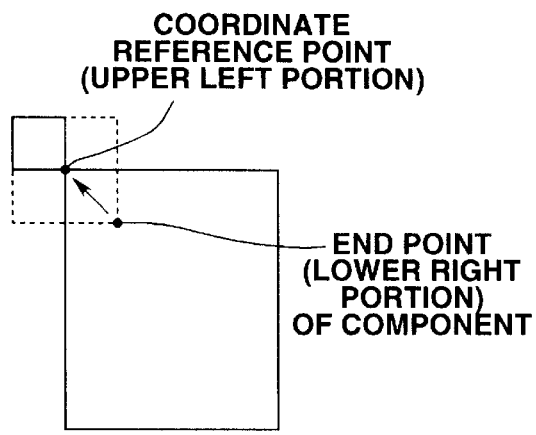
Figure 12C:
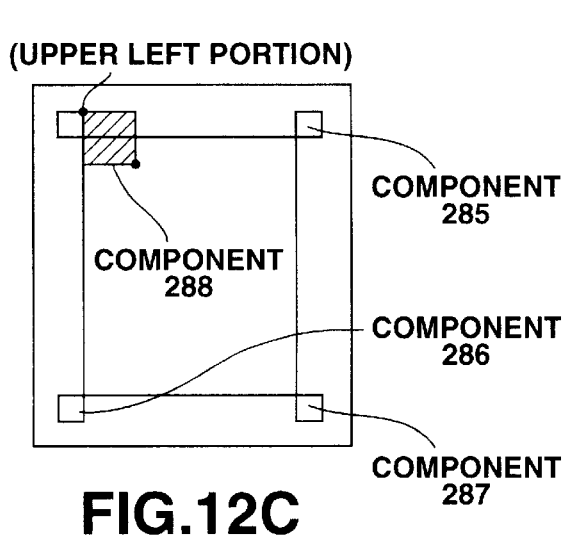
Figure 12D:
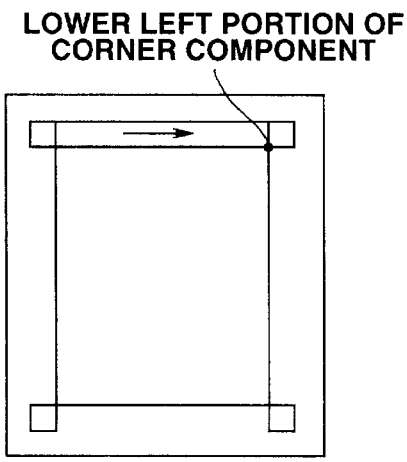
Figure 12E:
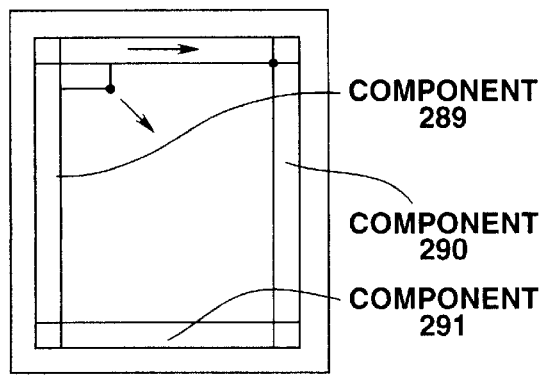

First, as indicated in FIG. 11A, the three-dimensional image with the shadow is subdivided into 9 image portions. FIG. 7 is a flow chart for indicating a decoration process operation such that a plurality of components are combined with each other, and the combined components are decorated. In other words, this flow chart of FIG. 7 indicates a portion of the process operation defined at the step A16 of FIG. 6. That is, at a first step B1, positional coordinate values of four corners of a ruled line frame to be designed are extracted, and the extracted coordinate values are set as reference coordinate points. Next, the corner components for constituting these four corners of the three-dimensional image with the shadow are arranged at the corner portions of the ruled line frame in such a manner that these corner components are enlarged/compressed (reduced) without changing the aspect ratio thereof (step B2). That is, FIG. 12A and FIG. 12B are explanatory diagrams for explaining arrangement conditions of the corner components in this case. First, an upper left corner component indicated by an illustration ID "284" is read and also the upper left corner component is arranged in such a manner that an upper left portion of this corner component is located at a predetermined position along the upper left incline direction (namely, position separated by 4 columns and 2 lines) while setting the upper left portion of the ruled line frame as a reference point (see FIG. 12A). Then, the corner component is enlarged/compressed in such a way that an end point (lower right point) of this upper left corner component is located at an upper left coordinate point of the ruled line frame. As a result, the upper left corner component is arranged with such a size as shown in FIG. 12B while setting the upper left portion of the ruled line frame as the reference. This upper left corner component maintains the aspect ratio of 2:1 of the original corner component.

When the arrangement of the upper left corner component is accomplished in this manner, the process operation is advanced to a further step B3. At this step B3, a check is made as to whether or not the arrangements of the four corner components are accomplished. Now, since the first corner component has been arranged, the process operation is returned to the step B2. At this step B2, an upper right corner component indicated by an illustration ID "285" is read and also the upper right corner component is arranged in such a manner that this upper left corner component is enlarged/compressed, while setting the upper right portion of the ruled line frame as a reference point. Subsequently, a lower left corner component indicated by an illustration ID "286", and a lower right corner component indicated by an illustration ID "287" are sequentially read, and these three corner components are arranged in such a manner that these corner components are enlarged/compressed without changing the aspect ratios thereof while setting the lower left portion and the lower right portion of the ruled line frame in a similar manner.

When the arrangements of all of the four corner components are complete, the process operation is advanced to a step B4. At this step B4, outside components are read, and thereafter are arranged in such a manner that these outside components are enlarged/compressed while changing the aspect ratios in order to couple these corner components to each other. In other words, first, an upper side component indicated by an illustration ID "288" is read, and then is arranged in such a manner that an upper left portion of this upper side component is fitted to a lower right portion of the upper left corner component (see FIG. 12C). Thereafter, the upper side component is enlarged/compressed along the line direction in such a way that this upper side component is stored into an end (lower right) position of the upper left corner component, and furthermore is enlarged/compressed along the column direction in such a manner that the lower right portion of the upper side component is located at a lower left portion of the upper right corner component (see FIG. 12D).

When the arrangement of the upper side component is accomplished in this manner, the process operation is advanced to a further step B5. At this step B5, a check is made as to whether or not the arrangements of the upper/lower/right/left outside components are accomplished. Now, since the first upper side component has been arranged, the process operation is returned to the step B4. At this step B4, the next outside component, namely a left side component indicated by an illustration ID "289" is read, and then is arranged in such a manner that this left side component is enlarged/compressed while changing the aspect ratio thereof in order to couple the upper left corner component with the lower left corner component. Subsequently, a right side component indicated by an illustration ID "290", and also a lower side component indicated by an illustration ID "291" are sequentially read, and then are arranged in such a way that these right/lower side components are enlarged/compressed while changing the aspect ratios thereof so as to couple the corner components in a similar manner.

As a result, when the arrangements of all of the upper/lower/right/left outside components are accomplished, the process operation is advanced to a next step B6. At this step B6, a center component indicated by an illustration ID "292" is finally read, and then is enlarged/compressed in such a manner that a center portion within the ruled line frame is filled with this center component while changing the aspect ratio thereof. In other words, this center component is enlarged/compressed along both the line direction and the column direction in such a manner that an upper left portion of this center component is fitted to a lower right portion of the upper left corner component (see FIG. 12E), and a lower right portion of this center component is stored into an upper left position of the lower right corner component. As a result, when the arrangements of all of the components are ended, the combined plural components are grouped as a single figure (step B7). Another check is made as to whether or not this grouping operation of these combined plural components succeeds at a step B8. In the case of "success", the ruled line frame to be designed is deleted, and these plural components are replaced by the grouped image (step B9). In this case, since the combined plural components are grouped as a single image, there are only reference points at the four corners, so that a seamless image can be produced.

FIGS. 13A and 13B represent another decoration process example when a plurality of components are combined with each other, and then the combined components are decorated. That is, a band-shaped three-dimensional image with a shadow, having semi-circular both edges, is subdivided into both edge components and a center component, which are stored. When these both edge components are arranged within a ruled line frame to be designed, these subdivided components are arranged in such a way that the both edge components are enlarged/compressed without changing the aspect ratio thereof, whereas the center component is enlarged/compressed with changing the aspect ratio thereof so as to couple the both edge components with each other.

Figure 14:
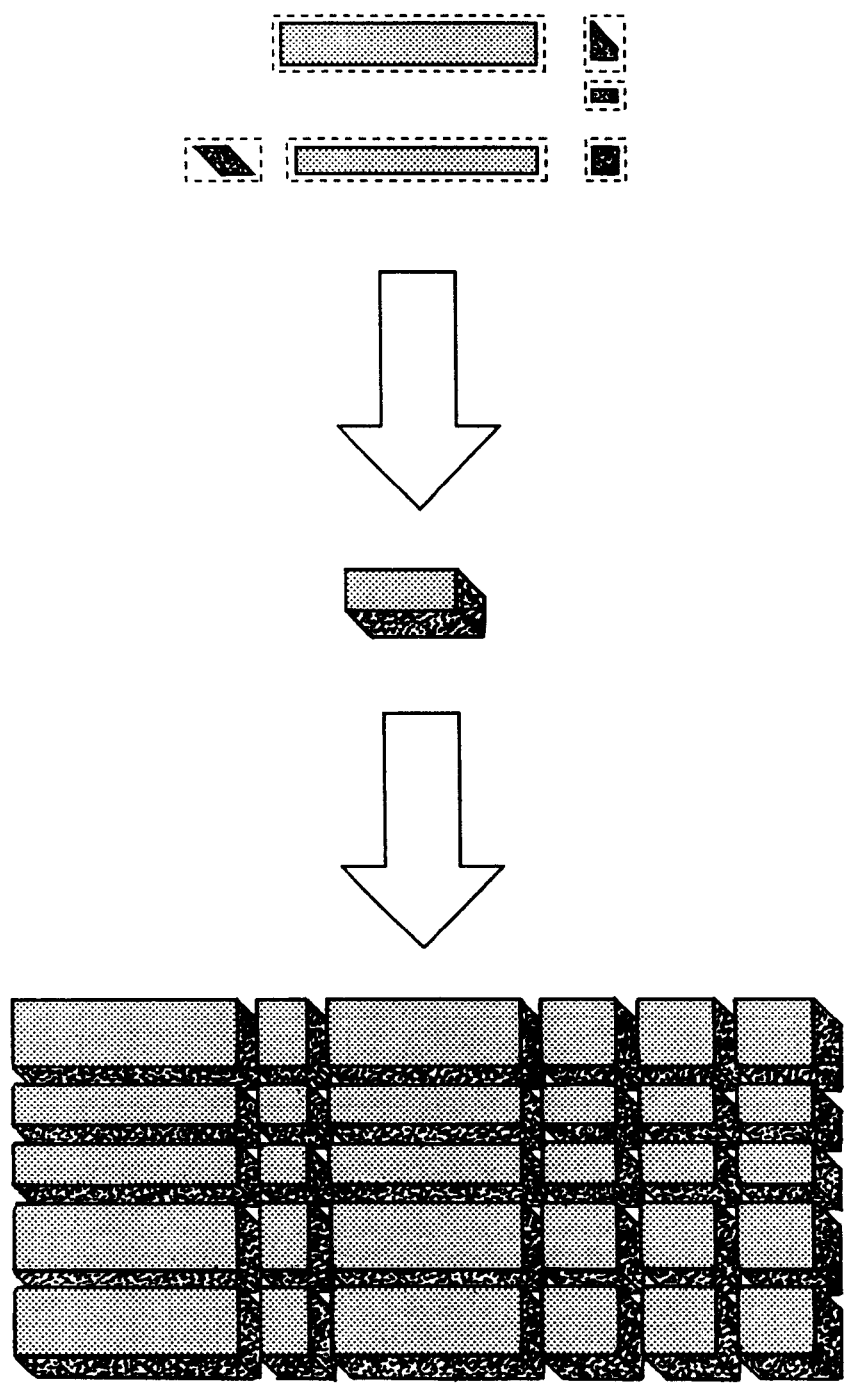
FIG. 14 illustrates a design of a table used in the first embodiment mode.

FIG. 14 represents another decoration process example when a plurality of components are combined with each other to thereby decorate a table. The respective cells for constituting the table are produced by combining a plurality of components. In this case, a single cell is produced by combining 6 sorts of components in total involving a component of a shadow in accordance with a preselected sequential order.

ADVANTAGES OF FIRST DOCUMENT PROCESSING APPARATUS

As previously described in detail, in the document processing apparatus according to the first embodiment mode, the document structures of the overall document are analyzed in the unit of the single document, the structural element of the attribute defined in the document structure analysis table 2—2 among these structural elements is extracted as the design element to be designed, and further the automatic design master table 2-4 is retrieved based upon this attribute with respect to each of the extracted design elements. In accordance with this retrieved result, since the contents described in the element design command table 2-5 are executed, each of the design elements can be decorated based on the contents previously defined in the automatic design master table 2-4, the element design command table 2-5, and the decoration code table 2-6. As a consequence, the respective elements contained in the document, which should be designed, can be automatically decorated without performing the manual decoration works. As these elements to be designed, there are provided the title, the index, the figure, the caption, the page background, the character/symbol, and the arrow. Therefore, the document having the better design sense can be obtained by the first document processing apparatus.

In addition, the entire document can be designed in accordance with the designated usage/touch by that the operator merely selects/designates the usages, e.g., "document for planning report" and "document for OHP", and also the touches, e.g., "three-dimensional expression", "color", and "colorful". It is possible to obtain such a design desired by the user in the first document processing apparatus.

Also, in the first document processing apparatus, the positional information and the peripheral empty space information thereof are detected with respect to each of the design elements to be stored/saved. Based on this positional information and the peripheral empty space information, the dimension (size) of the design element after executing the decoration process is properly adjusted. As a consequence, for instance, the useless empty space can be removed from the entire document, and further the eccentric element arrangement can be avoided. Otherwise, in such a case that the size of the decorated design element is slightly larger than the size of the empty space, this slightly larger size can be reduced. Thus, the entire document can be made with the better design balance. In this case, in such a case that even when the size of the decorated design element is properly adjusted, a shortage of empty space is made, the decoration process operation is again tried based on the second subject design, the third subject design, - - - . Accordingly, it is possible to avoid such a fact that a shortage of design finally occurs.

Also, according to the first document processing apparatus, the design element is subdivided into the subdivided design elements, and these subdivided design elements are specifically decorated in unit of the each design element. As a result, for example, when this design element is the table data, this table data can be decorated in unit of the single cell. Furthermore, only the specific character and the symbol, which constitute the character string, can be decorated.

Moreover, in the first document processing apparatus, a plurality of illustration components are combined with each other so as to decorate the combined illustration components, and also the dimensions of the respective illustration components can be adjusted. As a result, it is possible to produce the image being full of variety. Also, it is possible to obtain such an image fitted to the dimensions and the shapes of the design elements. In this case, when a plurality of components are combined with each other and the combined components are arranged in response to the element to be designed, the components which will be arranged at preselected positions are enlarged/compressed without changing the aspect ratios thereof, whereas the components which will be arranged at other positions are enlarged/compressed by changing the aspect ratios thereof. Therefore, even when the plural components are designed along the longitudinal direction (see FIG. 11B), or along the lateral direction (see FIG. 11C), it is possible to obtain such a decorated design approximated to the original design. Also, in the case shown in FIGS. 13A and 13B, both edge portions are not deformed in the ellipse shapes, but may be similar to the original shapes. As a consequence, when the element to be designed is decorated by employing the image, depending upon the sort thereof, even if the element to be designed owns any shape, this element to be designed can be decorated without any collapse in the original image feeling.

It should be understood that according to the first embodiment mode, not only the above-explained images, but also any other sorts of images can be obtained by combining a plurality of components. In the above-described first embodiment mode, the automatic design master table 2-4, the element design command table 2-5, and the decoration code table 2-6 are separately employed as the independent tables. Alternatively, these tables may be arranged as a single table. If the default values of the respective tables may be arbitrarily changed by the operator, a portion of the designed document may be amended in accordance with the operator's desires.

Furthermore, in such a case that the content of the document structure analysis table 2—2 is displayed as a list and then the operator selects/designates an arbitrary design element from this list, only the selected design element may be extracted as the element to be designed from the document.

ARRANGEMENT OF SECOND DOCUMENT PROCESSING APPARATUS

Referring mainly to FIG. 17 to FIG. 26, an arrangement of a document processing apparatus according to a second preferred embodiment of the present invention will be now described. It should be understood that the document processing apparatus of the first embodiment mode is featured by such that the dimension of the decorated design element is adjusted based on the empty space information around this design element, whereas the document processing apparatus of the second embodiment mode is featured by such that when there is no empty region required to decorate a design element, which is located around this element to be designed, the design process operation is carried out after the necessary empty region has been secured.

It should also be noted that in this second embodiment, since structure/functions of this second document processing apparatus are basically the same as these of the first document processing apparatus, the structural diagram of FIG. 1 is commonly used. That is, the second document processing apparatus employs a RAM 12 instead of the above-explained RAM 2.

First, peripheral empty space information indicates a rectangular-shaped empty region existing around a design element. That is, this peripheral empty space information indicates how many empty spaces along upper/lower/right/left directions, involving the design element. A size of this empty region is defined by a column number (quantity) and also a line number (quantity). These column/line numbers are detected by the CPU 1 respectively when a document structure is analyzed, and the detected column/line numbers are set to a document analysis result memory 12-3.

Next, FIG. 17 schematically indicates an internal arrangement of a RAM 12 employed in this second document processing apparatus. As indicated in FIG. 17, various sorts of memory regions are allocated to this RAM 12. Since a document memory 12-1 to a work memory 12—12 correspond to the above-described document memory 2-1 to work memory 2-12 employed in the first document processing apparatus, detailed descriptions thereof are omitted. In this RAM 12 of the second embodiment mode, an empty information table 12-13 is newly provided. This empty information table 12-13 fixedly stores therein information for indicating how many empty regions are required when design elements are decorated by designs indicated by the corresponding design numbers thereof with respect to each of design element IDs and each of design numbers. This empty information table 12-13 is so arranged as to store a plurality of record data while setting a design ID, a design number, a column number, a line number, a calculation parameter "1", and another calculation parameter "2" as record data for 1 line. In this case, in the element design command table 12-5, the empty information table 12-13 is addressed based on a design ID and a subject-1 design number (first subject design), which are designated every 1 line among the respective lines designated as the line to be processed, and record data of the corresponding line is read out. In this second embodiment mode, when the calculation parameters "1" and "2" are equal to "0" respectively, the column number and also the line number within this record data directly constitute the necessary empty region. To the contrary, when numerals more than "1" are defined as the calculation parameters "1" and "2", a predetermined calculation is executed in accordance with the column number thereof, the values of these calculation parameters "1", "2", and the column number of the design element, so that the column number of the required empty region is calculated. It should be noted that this calculation will be described more in detail. The CPU 1 determines how many empty regions are required when the design element is decorated by the design indicated by the design number with reference to this empty information table 12-13. Thereafter, the CPU 1 compares this required region with the empty regions existing around the design element so as to judge as to whether or not there is a shortage of space with respect to each of the design elements existing in the overall document. If there is a shortage of space, then the character string and the figures existing around the design element are moved along the outside direction (right/left directions/upper/lower directions) in response to this shortage amount, so that the necessary empty region can be secured within the document. In such a case, when the necessary empty region could not be secured by merely moving the data, the text format of the data existing around this design element is changed to re-edit the data, so that the necessary empty region can be secured.

OPERATIONS OF SECOND DOCUMENT PROCESSING APPARATUS

Referring now to flow charts shown in FIG. 19 and FIG. 23, operations of the second document processing apparatus will be explained. It should be understood that the programs capable of realizing various functions as described in the below-mentioned flow charts are stored in the storage medium 4 in the program code formats readable by the CPU 1, and the contents of these programs are loaded on the work memory 12—12 employed in the RAM 12 (see FIG. 1).

Figure 19:
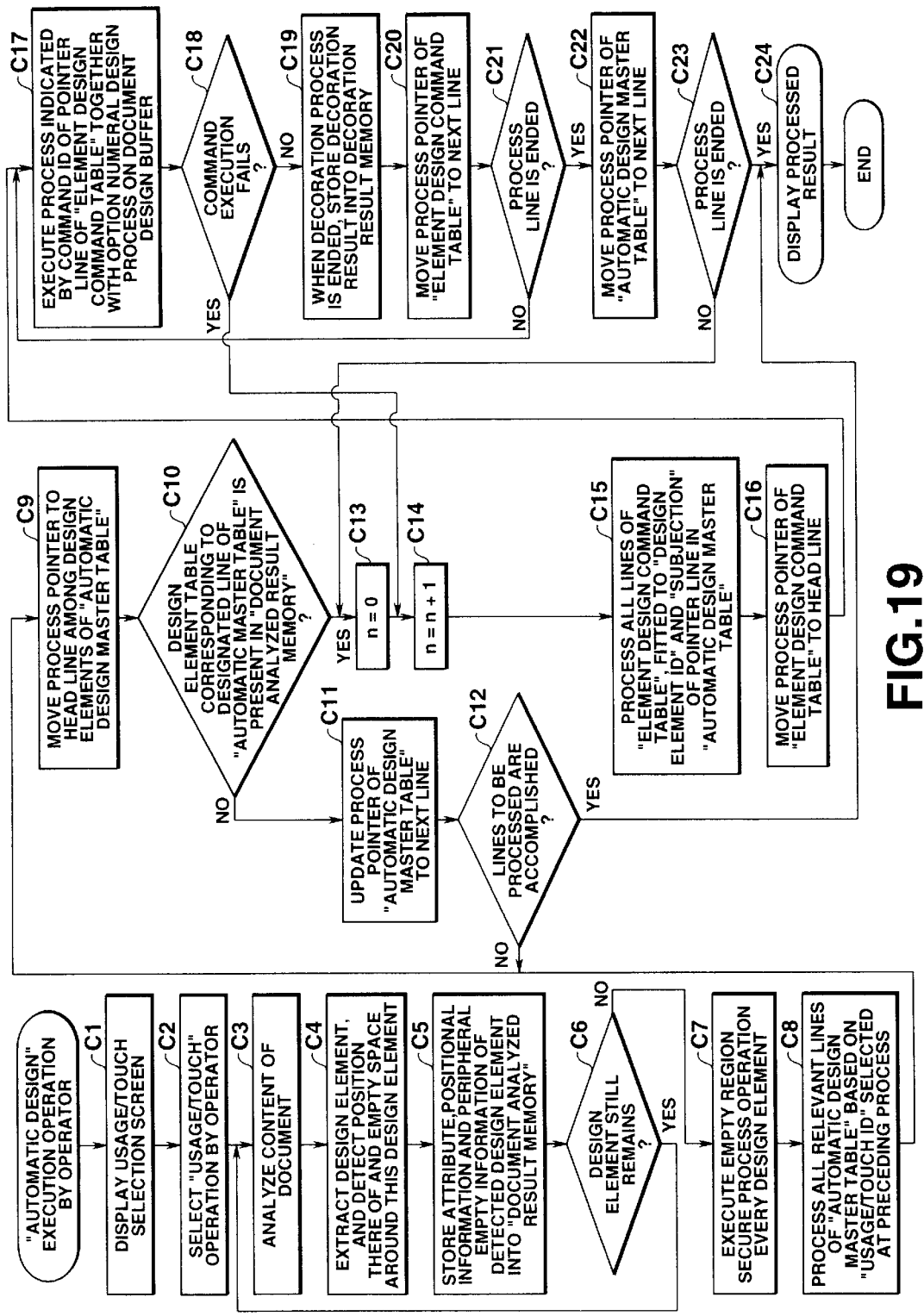
FIG. 19 is a flow chart for explaining an automatic design process operation executed in the document processing apparatus according to the second embodiment mode.

Now when the document data stored in the document memory 12-1 is designated as a document to be designated, and also the automatic design command is entered from the input apparatus 5, the execution of the automatic design process operation is commenced in accordance with the flow chart shown in FIG. 19. First, since the menu items of the usage/touch are list up based on the content of the automatic design master table 12-4 (step C1), the operator selects/designates an arbitrary menu items from this display screen (step C2). It is now assumed that such a document as indicated in FIG. 8 is designated as the document to be designed, and furthermore the touches "document for planning report"/"color" are selected/designated.

As a result, the CPU 1 sequentially analyzes this document from the head (top) line thereof (step C3), extracts the design element with reference to the document structure analysis table 12-2, and detects the position of this extracted design element and also the empty space around this extracted design element (will be also referred to as a "peripheral empty space information" hereinafter) (step C4). Since a character string "Designer" of the head line indicated in FIG. 8 corresponds to the title defined in the document analysis table 12—12, the CPU 1 stores the attribute "title" thereof, the positional information, and the peripheral empty space information into the document analyzed result memory 12-3 (step C5). It should be noted that the process operation for detecting/registering the empty space information will be discussed more in detail. Then, a check is made as to whether or not there is such a design element having a condition corresponding to the design element defined in this document structure analysis table 12-2 (step C6). If the design element is present, then the automatic design process operation is returned to the previous step C3, so that the above-explained process operation is repeatedly performed. As a result, "main title", "medium title", "subtitle", - - - are extracted as the design elements, respectively, and then the analyzed results are stored into the document analyzed result memory 12-3 with respect to each of these design elements. In this case, a character string "XXXX - - - XX" appearing within the rectangular shape is recognized as "main title"; another character "S?1.XX" is recognized as "medium tile"; and another character string "000" is recognized as "subtitle". Also, such a character string containing a matrix-shaped ruled line is recognized as a table (list) which may constitute an element to be designed. Other document data are excluded from the elements to be designed.

Figure 20:
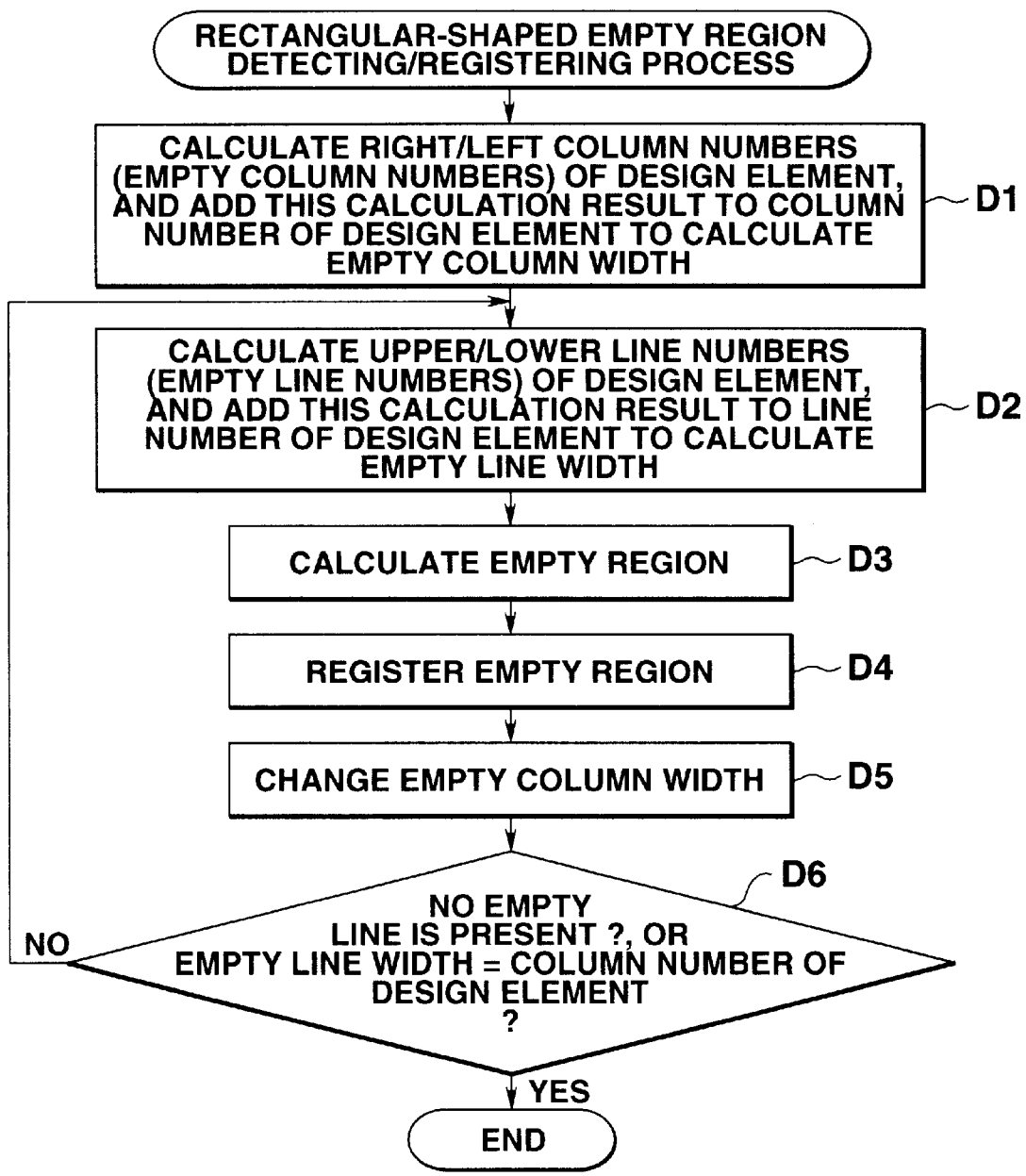
FIG. 20 is a flow chart for describing, in detail, an empty region detecting/registering process operation among the automatic design process operations defined at steps C4 and C5 of FIG. 19.
Figure 24:
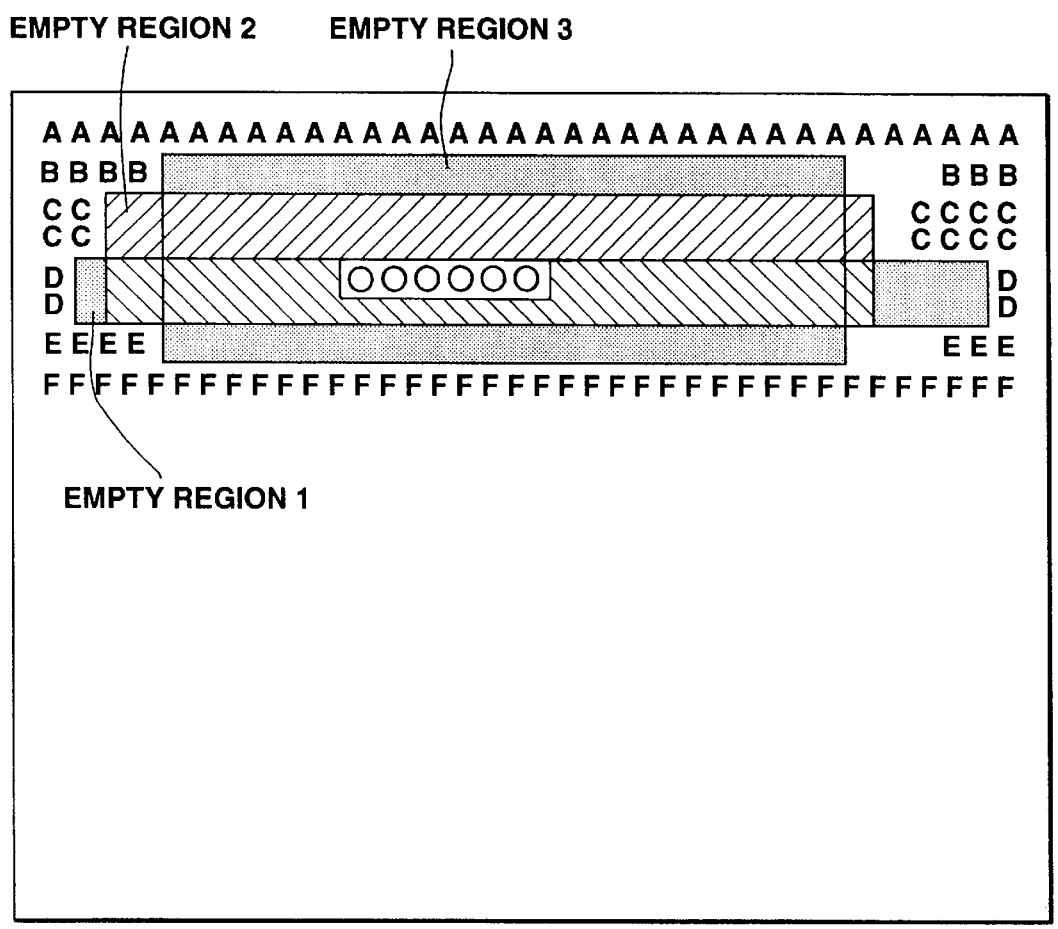
FIG. 24 is an explanatory diagram for explaining how to detect an empty region is detected when an empty region around a design element is detected, according to the second embodiment mode.

In this case, FIG. 20 is a flow chart for describing only the empty region detecting/registering process operation among the process operations executed in the steps C4 and C5. Referring now to a concrete example shown in FIG. 24, this empty region detecting/registering process operation will be explained. At a first step D1, a check is made as to whether or not the extracted design element is sequentially scanned in unit of one column along a left direction so as to investigate how many columns are empty. Also, another check is done as to whether or not the extracted design element is sequentially scanned in unit of one column along a right direction in order to investigate how many columns are empty. As a result, a total number of empty columns is calculated along the right/left directions. Then, the column number of the design element is added to this total number to thereby obtain the addition result as an empty column width. Based on a column width of one line region calculated in this manner, the extracted design element is scanned in unit of a single line along an upper direction and a lower direction so as to check how many lines are empty while maintaining this column width. The line number of the design element is added to a total number of upper/lower lines, and the added result is used as an empty line width (step D2). Thereafter, the empty column width is multiplied by the empty line width to calculate a rectangular-shaped empty region (step D3), and also this empty region is registered as empty space information into the document analyzed result memory 12-3 (step D4). As a result, it is assumed that a first rectangular-shaped empty region "1" shown in FIG. 24 is registered into the document analyzed result memory 12-3. Next, the process operation is advanced to a step D5. At this step D5, although the empty column width is changed, a column width of such a line is changed as a new column width, which line is judged as "no empty" by scanning the extracted design element along the upper/lower direction with the column width of the presently registered empty region. Then, a check is made as to whether this newly changed column width is equal to the column number of the design element, or the empty line is not present along the upper/lower direction (step D6). If this column width is not equal to the column number of the design element, the process operation is returned to the step D2. Also, if the empty line is present, then another check is done as to whether or not the empty of the upper/lower line number of the design element is present by a new column width. As a consequence, a rectangular empty region "2" shown in FIG. 24 is detected to be registered into the document analyzed result memory 2-3. Then, after the empty column width is changed, a similar process operation is repeatedly performed. As a result, a rectangular empty region "3" shown in FIG. 24 is registered into the document analyzed result memory 12-3. In this case, since no more empty lines are present along the upper/lower direction, this fact is detected at a step D6, and then, the process operation jumps from this flow operation.

As a result of repeating such an operation with respect to each of the design elements, empty regions corresponding to the design elements of the overall document, for example, the index, the main title, the medium title, the subtitle, and the table are registered into the document analyzed result memory 12-3. Then, when the analysis of the entire document is ended and a detection is made of "no design element" at a step C6, the process operation is advanced to a step C7. At this step C7, a process operation for securing a necessary empty region is carried out under such a condition that necessary empty regions used to design elements are not present around the relevant design elements with respect to each of the design elements.

EMPTY REGION SECURING PROCESS OPERATION

Figure 21:
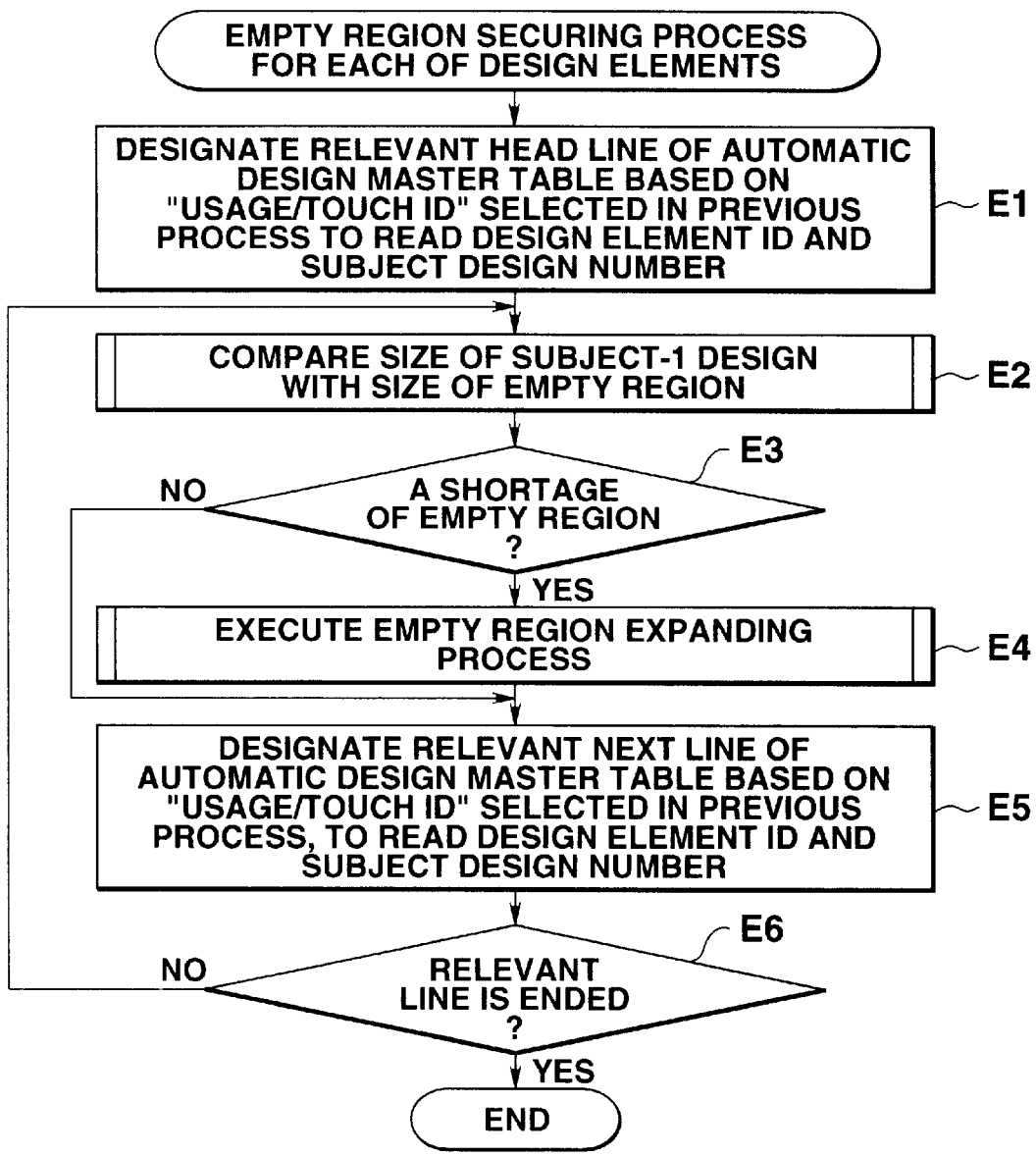
FIG. 21 is a flow chart for describing, in detail, an empty region securing process operation for each of design elements, defined at a step C7 of the flow chart shown in FIG. 19.

FIG. 21 is a flow chart for describing the above-explained empty region securing process operation. It is now assumed that a necessary empty region has already been present around each of design elements of the original document shown in FIG. 8. In such a case, since the empty region is not required to be secured, the process operation is advanced to a step A8. At this step A8, the CPU 1 retrieves the automatic design master table 12-4 based on the usage/touch ID select/designated in the previous process to thereby designate all of the lines corresponding to the usage/touch ID to be processed. FIG. 18A represents such a case that "1" is designated as the usage/touch ID, namely "document for planning report"/"color" are designated. Next, the CPU 1 sets a value of the process pointer N for designating a read address of the automatic design master table 12-4 among the lines to be processed as a head line thereof (step C9). Then, another check is made as to whether or not the design element corresponding to the designated line of the automatic design master table 12-4 is set into the document analyzed result memory 12-3 (step C10). If the corresponding design element is not present, then the process pointer N of the automatic design master table 12-4 is updated to the subsequent line (step C11). As a result, another check is made as to whether or not all of the lines to be processed have been designated (step C12). If the line designation is not accomplished, then the process operation is returned to the step C10. The operation for retrieving the design element set in the document analyzed result memory 12-3 is repeatedly performed.

As a result, when the relevant design element is retrieved, the process operation is advanced to a step C13 so as to clear the value of the n-register 12—12. In this case, the n-register 12—12 addresses the subject design number described in the automatic design master table 12-4. After the content of the n-register 12-11 is cleared, "1" is added to the value of this n-register 12-11 at the next step C14, so that "1" is set as an initial value to the value of the n-register 12-11. Then, the CPU 11 retrieves the design element ID stored in the automatic design master table 12-4 designated by the process pointer N, and also a subject-n design number designated by the value of the n-register 12-11, and thereafter retrieves the element design command table 12-5 based on these read design element ID and subject-n design number so as to designate all of the lines fitted to these design element ID/subject-n design number as the lines to be processed (step C15). FIG. 18 represents such a case that the respective lines stored in the element design command table 12-5 and corresponding to the design element ID "1" and the design number "2" are designated as the lines to be processed. Then, a value of the process pointer M for designating the read address of the element design command table 12-5 among the lines to be processed is set as a head line thereof (step C16).

Under this condition, a decoration process operation indicated by the "command ID" described in the designated line stored in the element design command table 12-5 is executed with reference with the option numeral values OP1 to OP10 (step C17). In this execution, the decoration process operation of the design element is performed on the document design buffer 12-7.

CONCRETE EXAMPLES OF DECORATION

A description will now be made of concrete examples of decoration process operations executed in the second document processing apparatus. In accordance with the second document processing apparatus, an illustration designated by an option numeral value is called from the figure component memory 12-9 of the RAM 12 so as to be arranged as a background image at a head character position and the like of a design element, more than 2 illustrations are called from this figure component memory 12-9 so as to be combined with each other, and then the combined image is arranged as a background image. Alternatively, a background image is shadowed, varnished, or colored. Furthermore, a dimension (size) of a background image is controlled, or adjusted based upon peripheral empty space information set into the document structure analysis table 12-2, which corresponds to this design element. Also, a character string of a design element is superimposed on a background image, a character string of a design element is converted into a writing style and the like defined in the decoration code table 12-6, or this character string is colored. Alternatively, only characters which constitute a portion of a character string is enlarged/reduced, or inverted. Also, in the case that a plurality of components are combined with each other to thereby produce an image, while an aspect ratio of each of these components is changed, this component is enlarged/reduced based on peripheral empty space information, or is deformed. Alternatively, data for constituting a table is disassembled with respect to each of cells, and then the respective cells are specifically decorated, or only partial cell data is emphasized. It should be noted that these decoration process operations are executed in accordance with the command ID and the option numeral values OP1 to OP10, which are described in the element design command table 12-5, and the command execution sequential operations thereof. This second document processing apparatus can decorate the design elements in any ways in accordance with the contents described in the element design command table 12-5.

When the decoration process operation is carried out for the design element in accordance with the contents described in the design command table 12-5, the process operation is advanced to a step C 18 of the flow chart shown in FIG. 19, at which a judgement is made as to whether or not the command execution fails. In other words, such a judgement is made at this step C 18 as to whether or not a shortable of space occurs even when the dimension of the decorated design element is reduced/deformed to be adjusted based on empty space information around this design element. When a shortage of space occurs and the command execution fails, the process operation is returned to the step C 14 at which the value of the n-register 12-11 is updated, and a designation is made of a design number of the next subject within the automatic design master table 12-4 is designated. Subsequently, a similar process operation is repeatedly performed.

As a consequence, when a detection is made of such a fact that the command execution succeeds ("NO" at step C 18), the content (namely, decorated design element) of the document design buffer 12-7 is stored into the decoration result memory 12-8 (step C 19). Then, the process pointer M of the element design command table 12-5 is updated to the next line (step C 20). The above-described process operations defined from the step C 17 to the step C 21 are repeatedly performed until all of the lines to be processed, saved in the element design command table 12-5 are ended (step C 21).

As a result, when the completion of the process operation is detected at a step C 21, the automatic design process operation is advanced to a further step C 22 at which the updating process operation is carried out for the process pointer N of the automatic design master table 12-4. Then, the above-explained process operations defined from the step C 10 to the step C 23 are repeatedly performed until all of the lines to be processed, saved in the automatic design master table 12-4 are ended (step C 23). As a consequence, when the decoration process operation is accomplished for all of the design elements contained within one document, this fact is detected at the step C 23. Thus, the process operation is advanced to a step C 24. At this step C 24, the content of the document memory 12-1 is displayed. In this case, the design element saved in the document memory 12-1 is replaced by the content saved in the decoration result memory 12-8 to be displayed.

As a consequence, as apparent from this designed document of FIG. 10, "title", "main title", "medium tite", "subtitle", and "table" are full of variety, as compared with those of the original document. Since the relevant portions are visually emphasized, the operators can readily read the entire document, and also this designed document owns better appearances.

Figure 25:
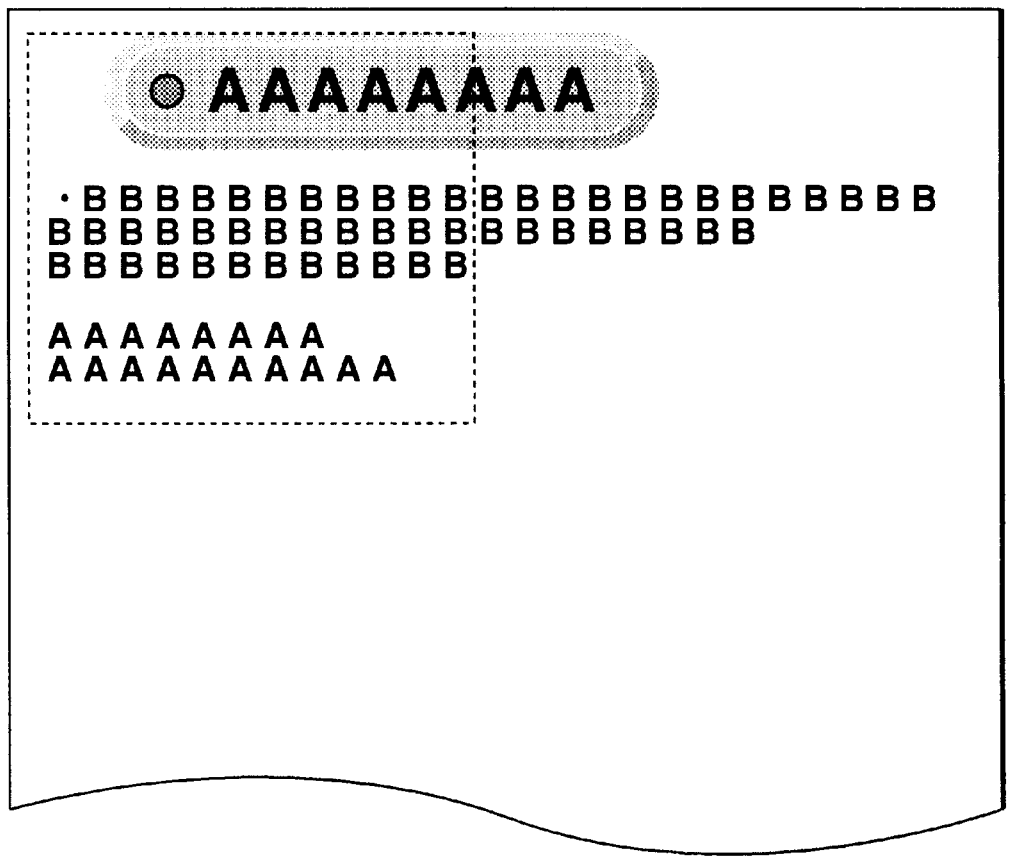
FIG. 25 is an illustration such that when a title portion of another original document is designed, this title portion is designed without securing an empty region around this title portion.

On the other hand, in the original document shown in FIG. 8, the empty regions required to design the respective design elements have been located around these design elements. Subsequently, the following description is made of such a case that there is no necessary empty region around the respective design elements. In such a case, a process operation for securing an empty region with respect to each of the design elements is carried out at the step C 7 of FIG. 6. FIG. 25 and FIG. 26 illustrate concrete examples of the above-described case that there is no necessary empty region. Concretely speaking, FIG. 25 represents such a concrete example that a title is designed while not securing an empty region. In this concrete example, since an empty region around the title is small, there is no way other than a small and not-colorful design. To the contrary, as indicated in FIG. 26A, when a necessary empty region is previously secured around a title, it is possible to achieve a colorful and effective design, as indicated in FIG. 26B.

DETAILED EMPTY REGION SECURING PROCESS OPERATION

Figure 26B:
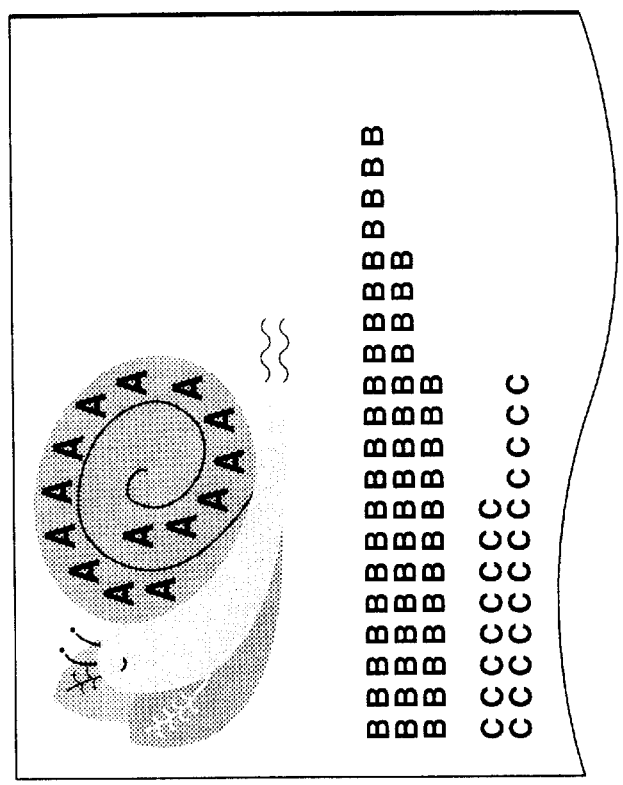
FIG. 26B represents such a condition that after an empty region is secured, the title portion is designed.
Figure 26A:
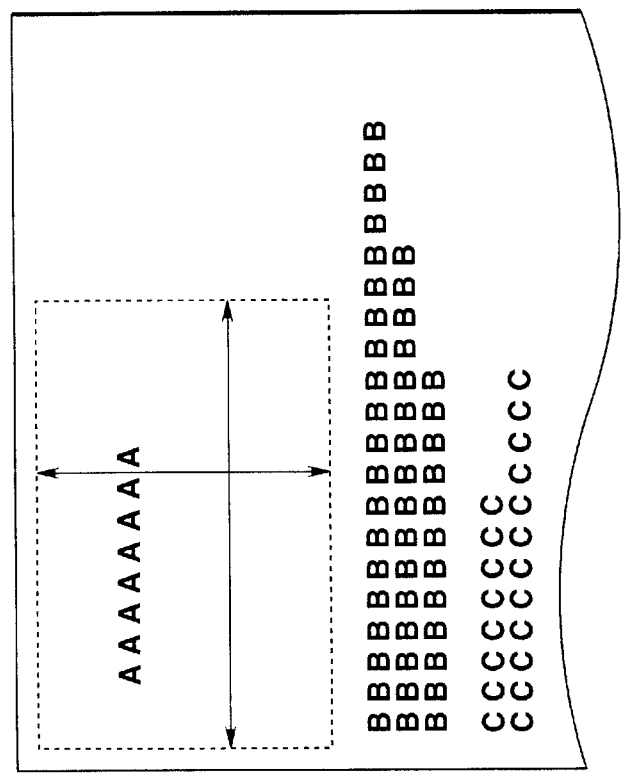
FIG. 26A illustrates such a condition that an empty region is secured in the title portion of the original document shown in FIG. 25.

In accordance with the second document processing apparatus, this empty region shown in FIG. 26B can be secured based upon a flow chart described in FIG. 21.

Figure 22:
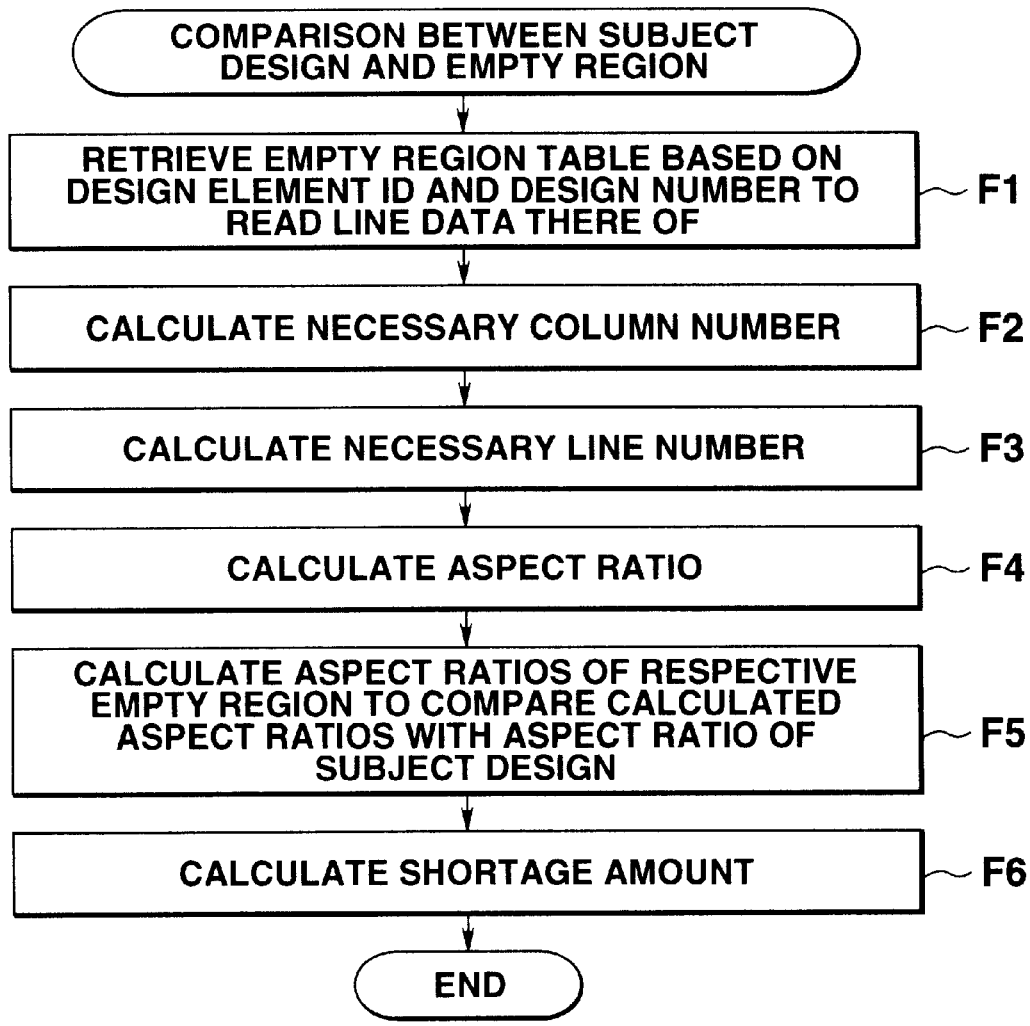
FIG. 22 is a flow chart for describing, in detail, a comparing process operation between a subject design and an empty region, defined at a step E2 of the flow chart shown in FIG. 21.

First, the CPU 1 designates the relevant head line of the automatic design master table 12-4 based upon the usage/touch ID selected by the preceding process operation to thereby read the design element ID and the subject-1 design number (step E 1). Then, the CPU 1 compares a size of such a design indicated by this subject-1 design number with a size of an empty region (step E 2). FIG. 22 is a flow chart for explaining this size comparing process operation as follows:

That is, based on both the design ID and the subject-1 design number read out from the automatic design master table 12-4, the empty information table 12-13 is retrieved so as to read out the record data of the line corresponding thereto (step F 1). A necessary column number and a necessary line number of a subject design required to design are calculated from numeral values contained in this record data (step F 2 and F 3). In this case, when both the calculation parameters "1" and "2" saved in the empty information table 12-13 are commonly equal to "0", the necessary column number and the necessary line number are equal to a set column number and a set line number saved in the empty information table 12-13. However, when both the calculation parameters "1" and "2" are not equal to "0", a necessary column number is calculated in accordance with the following formula:

Necessary column number=Set column number/calculation parameter "1"×Design element's column number+Calculation parameter "2".

Also, when both the calculation parameters "1" and "2" are not equal to "0", a necessary line number becomes a set line number. Thus, based upon the necessary column number and the necessary line number calculated in the above-described manner, an aspect ratio of the subject design is calculated by necessary column number/necessary line number (step F 4). Then, aspect ratios for the respective empty regions registered in the document analyzed result memory 12-3 are calculated. These calculated aspect ratios are compared with the aspect ratio of the subject design. Accordingly, a decision is made of such an empty region whose aspect ratio is most closed to that of the subject region (step F 5). A storage amount is calculated from the empty region determined in this manner and the subject design region obtained at the steps F 2 and F 3 (step F 6). In other words, the following calculation is carried out:

Shortage column number=Subject design column number−Empty region column number;

Shortage line number=Subject design line number−Empty region line number.

When such a comparison process operation is accomplished, the process operation is advanced to a step E 3 of FIG. 21, at which a check is made as to whether or not a shortage of empty region occurs based on this process result. If the value of the shortage column number and the value of the shortage line number are smaller than, or equal to 0, then since a total number of empty regions is larger than the necessary number of the empty regions, it is so judged that a shortage of empty regions does not occur. If the shortage column number and the shortage line number are >0, it is so judged that a shortage of empty regions occurs. As described above, in the case of a shortage of empty regions, both the shortage column number and the shortage line number correspond to numeral values for indicating how many regions around the design element should be made empty. Thereafter, the process operation is advanced to a process operation for expanding an empty region by using this numeral value (step E 4).

EMPTY REGION EXPANDING PROCESS OPERATION

Figure 23:
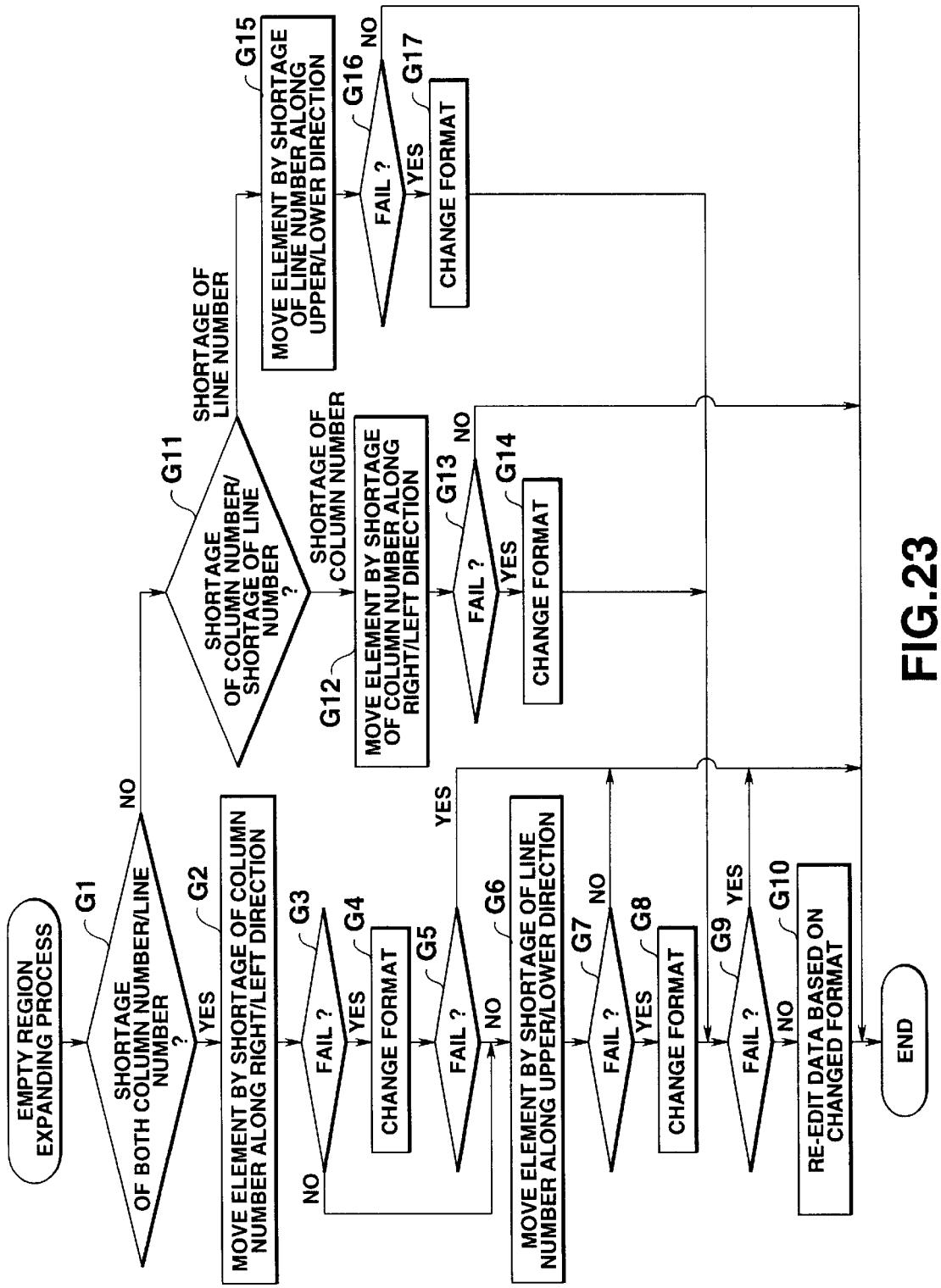
FIG. 23 is a flow chart for describing, in detail, an empty region extending process operation defined at a step E4 of the flow chart shown in FIG. 21.

FIG. 23 is a flow chart for describing this empty region expanding process operation.

First, when a shortage of both the column number and the line number occurs (step G 1), a column transfer is carried out in such a way that data located right/left-outside a design element is transferred by a shortage of column number along the right/left direction (step G 2). As a result of shifting the data by the shortage of column, a check is made as to whether or not the data is shifted out from the page effective region (namely, whether or not column shift fails) at a step G 3. Conversely, when the column shift succeeds, the process operation is advanced to a step G 6. At this step G 6, such a line transfer is carried out in such a manner that data located upper/lower-outside a design element is transferred by a shortage of line number along the upper/lower direction. As a result, another check is made as to whether or not the data is shifted out from the page effective region (namely, whether or not line shift fails) at a step G 7. If the line transfer succeeds, the process operation jumps from this flow operation, so that the expanding operation of the empty region is accomplished. On the other hand, in such a case that the fail of the line transfer is detected at the step G 3, the process operation is advanced to a step G 4. At this step G 4, a format (column pitch) change is carried out. Now, it is assumed that an original format column number is C0, and a column pitch is PC, the following calculations are performed:

Changed format column number C0+shortage of column number; and

Changed column pitch=(C0+PC)/(C0+shortage of column number)

In this case, when the changed column pitch becomes smaller than, or equal to a predetermined value, namely is excessively compressed, it may be regarded that the format change fails (step G 5). Also, when the fail in the line transfer is detected at the step G 7, the process operation is advanced to a step G8 at which the format (line pitch) change is carried out. Now, it is assumed that an original format line number is L0, and a column pitch is P1, the following calculations are performed:

Changed format line number=L0+shortage of line number; and

Changed line pitch=(L0×P1)/(L0+shortage of column number)

In this case, when the changed line pitch becomes smaller than, or equal to a predetermined value, namely is excessively compressed, it may be regarded that the format change fails (step G 9). On the other hand, when the format changes succeed at the steps G 4 and G 8, the data is re-edited in accordance with the changed formats (step G 10).

Also, in such a case that the shortages of both the column number and the line number do not occur, but a shortage of only one of these column number and line number occurs, the process operation is advanced to a step G 11. At this step G 11, a check is made as to whether a shortage of line number, or a shortage of column number occurs. In this case, when the shortage of column number occurs, a similar process operation to that of the above-described step G 2 to step G 4 is carried out (step G 12 to step G 14). In other words, the data is transferred by the shortage of column number along the right/left direction (step G 12). When the data transfer fails (step G 13), the format change is carried out (step G 14). Then, the process operation is advanced to the step G 9 at which a check is made as to whether or not the format change fails. Also, when the shortage of line number occurs, a similar process operation to that of the above-described step G 6 to step G 8 is carried out (step G 15 to step G 17). In other words, the data is transferred by the shortage of line number along the upper/lower direction (step G 15). When the data transfer fails (step G 16), the format change is carried out (step G 17). Then, the process operation is advanced to the step G 9 at which a check is made as to whether or not the format change fails.

When the above-described empty region expanding process operation is ended, the process operation is advanced to a step E 5 of FIG. 21. At this step E 5, the CPU 1 designates the relevant next line of the automatic design master table 12-4 based upon the usage/touch ID selected in the previous process operation to thereby read out a design element ID and a subject-1 design number. Then, a check is done as to whether or not the relevant line is ended (step E 6). Conversely, if the relevant line is not ended, then the process operation is returned to the step E 2 at which the above-explained operation is repeatedly performed. As a consequence, the necessary empty regions can be secured with respect to the respective design elements.

ADVANTAGES OF SECOND DOCUMENT PROCESSING APPARATUS

As previously described in detail, in the document processing apparatus according to the second embodiment mode, the document structures of the overall document are analyzed in the unit of the single document, the structural element of the attribute defined in the document structure analysis table 12-2 among these structural elements is extracted as the design element to be designed, and further the automatic design master table 12-4 is retrieved based upon this attribute with respect to each of the extracted design elements. In accordance with this retrieved result, since the contents described in the element design command table 12-5 are executed, each of the design elements can be decorated based on the contents previously defined in the automatic design master table 12-4, the element design command table 12-5, and the decoration code table 12-6. As a consequence, the respective elements contained in the document, which should be designed, can be automatically decorated without performing the manual decoration works. As these elements to be designed, there are provided the title, the index, the figure, the caption, the page background, the character/symbol, and the arrow. Therefore, the document having the better design sense can be obtained by the second document processing apparatus.

Moreover, such a judgement is made as to whether or not the necessary empty region is present around the design element in order to design this design element. If there is no necessary empty region, then the data positioned around this design element is merely moved along the outside direction so as to secure the necessary empty region. Conversely, in such a case that the necessary empty region could not be secured simply by shifting the data, the set formats (namely, column pitch and line pitch) are changed in order to secure the empty space. As a consequence, it is possible to make up more colorful/effective designs for the design element. In third case, even when the set formats are changed, if the necessary empty region could not be secured, then the decoration process operations are retried based on the second subject design, the third subject design, and so on. Accordingly, it is possible to finally avoid a shortage of design.

It should be understood that according to the first embodiment mode, the automatic design master table 12-4, the element design command table 12-5, the decoration code table 12-6, and the empty information table 12-13 are separately employed as the independent tables. Alternatively, these tables may be arranged as a single table. If the default values of the respective tables may be arbitrarily changed by the operator, a portion of the designed document may be amended in accordance with the operator's desires.

Furthermore, in such a case that the content of the document structure analysis table 12-2 is displayed as a list and then the operator selects/designates an arbitrary design element from this list, only the selected design element may be extracted as the element to be designed from the document.

Alternatively, in the case that even when the set formats are changed, the necessary empty region cannot be secured, the set formats may be changed within the changeable range to thereby secure the empty region. Then, the design element which has been decorated by the next subject design may be properly adjusted based on the empty region thereof.

In addition, in the above-explained second embodiment mode, when the empty region is secured every design element, the first subject design has been used as the reference design. Alternatively, the second subject design and the third subject design may be employed as the reference design.

What is claimed is:

1. A document processing apparatus for storing original document data which includes partial document data of a plurality of document structural elements, comprising:

a design information storage device which stores design information, corresponding to respective document structural elements, to change a designing subject document into a document designed in response to one of a plurality of design types, said design information of each of said respective document structural elements containing both first design information for synthesizing a preselected background image with partial document data of a first document structural element, and second design information for changing an entire table into one of a colored table and a three-dimensional table with respect to partial document data of a second document structural element;

a selector which arbitrarily selects a desirable design type from among said plurality of design types;

a changer which reads the design information in accordance with the respective document structural elements which correspond to the desirable design type selected by said selector, and while partial document data of the plurality of document structural elements which constitute said original document data are set as a subject, the changer changing the respective partial document data into one of said partial document data synthesized with said background image and said partial document data in which a table is changed into one of the colored table and the three-dimensional table with respect to the partial document data of the table; and an output device which outputs as designed document data, the document data combined with the partial document data which are changed by said changer, wherein when said preselected background image is added to the partial document data, depending upon said structural elements, said changer chances an output size of said preselected background image in response to an entire output size of partial document data to be added by said preselected background image.

2. A document processing apparatus for storing document data which constitutes a designing subject, comprising:

a design information storage device which stores a plurality of design types including at least a first design type and a second design type, and which stores thereinto such design information that said document data constituting the designing subject is changed into document data designed in response to the design type thereof, depending upon each of the design types;

a selector which arbitrarily selects a desirable design type from said plurality of design types;

a designing device which executes a design changing process operation such that when the first design type is selected by said selector, first design information corresponding to said first design type is read out and the design of said document data constituting the designing subject is changed based on said first design information, and also for executing another design changing process operation such that when the second design type is selected by said selector, second design information corresponding to said second design type is read out and the design of said document data constituting the designing subject is changed based on said second design information; and an output device which outputs the document data which has been changed in response to said selected design type by said designing device, wherein said design information storing device contains as said first design information, image adding information which indicates that a predetermined background image is newly added with respect to the document data constituting the designing subject;

said designing device executes an image synthesizing process operation such that when said first design type is selected, a basic pattern image of this image is read out based on the image adding information contained in said first design information;

such a background image being produced based upon said read basic pattern image, the size of which background image is made larger than an output size of said document data constituting the designing subject;

said produced background image used as a background image of the document data constituting the designing subject;

said design information storage device contains as said second design information, such table design information used to change an entire table into one of a colored table and a three-dimensional table with respect to table document-data in a table form which constitutes a designing subject; and said designing device executes a process operation in such a way that when said second design type is selected, an entire table of a table document is changed into one of a colored table and a three-dimensional table based upon the table design information contained in said second design information.

3. In a storage medium for storing thereinto a computer readable program executed in a document processing apparatus for storing original document data made of partial document data of a plurality of document structural elements, said computer readable program comprising:

a design information storage step for storing design information, corresponding to respective document structural elements, to change a designing subject document into a document designed in response to one of a plurality of design types, said design information of each of said respective document structural elements containing both first design information for synthesizing a preselected background image with partial document data of a first document structural element, and second design information for changing an entire table into one of a colored table and a three-dimensional table with respect to partial document data of a second document structural element;

a selecting step for arbitrarily selecting a desirable design type from among said plurality of design types;

a changing step for reading the design information in accordance with the respective document structural elements which correspond to the desirable design type s elected by said selecting step, and while partial document data of the plurality of document structural elements which constitute said original document data are set as a subject, for changing the respective partial document data into one of s aid partial document data synthesized with said preselected background image and said partial document data in which a table is changed into one of the colored table and the three-dimensional table with respect to the partial document data of the table; and an output step for outputting as designed document data, the document data combined with the partial document data which are changed by said changing step, wherein when said preselected background image is added to the partial document data depending upon said structural elements, said changing step changes an output size of said preselected background image in response to an entire output size of partial document data to be added by said preselected background image.

* * * * *

UNITED STATES PATENT AND TRADEMARK OFFICE
CERTIFICATE OF CORRECTION

PATENT NO. : 6,167,410
DATED : December 26, 2000
INVENTOR(S) : Keiichi Imamura

Page 1 of 1

It is certified that error appears in the above-identified patent and that said Letters Patent is hereby corrected as shown below:

Column 25,
Line 62, (claim 1, line 36), change "chances" to -- changes --;

Column 27,
Line 13, change "s elected" to -- selected --;

Column 28,
Line 10, after "data" insert -- , --.

Signed and Sealed this

Fourth Day of December, 2001

Attest:

*Nicholas P. Godici*

NICHOLAS P. GODICI
*Attesting Officer*      *Acting Director of the United States Patent and Trademark Office*